(12) United States Patent
Chen et al.

(10) Patent No.: US 10,360,456 B2
(45) Date of Patent: Jul. 23, 2019

(54) METHODS AND SYSTEMS OF MAINTAINING LOST OBJECT TRACKERS IN VIDEO ANALYTICS

(71) Applicant: QUALCOMM Incorporated, San Diego, CA (US)

(72) Inventors: Ying Chen, San Diego, CA (US); Lei Wang, Clovis, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 15/400,118

(22) Filed: Jan. 6, 2017

(65) Prior Publication Data

US 2018/0046863 A1   Feb. 15, 2018

Related U.S. Application Data

(60) Provisional application No. 62/374,284, filed on Aug. 12, 2016.

(51) Int. Cl.
 *G06K 9/00* (2006.01)
 *G06T 7/11* (2017.01)
 (Continued)

(52) U.S. Cl.
 CPC ........... *G06K 9/00744* (2013.01); *G06T 7/11* (2017.01); *G06T 7/246* (2017.01); *G06T 7/70* (2017.01);
 (Continued)

(58) Field of Classification Search
 None
 See application file for complete search history.

(56) References Cited

U.S. PATENT DOCUMENTS 8,116,564 B2 *  2/2012  Kilambi ............... G06M 11/00
                                                     382/103
8,374,388 B2 *  2/2013  Stolkin ................ G06K 9/3241
                                                     382/103

(Continued)

FOREIGN PATENT DOCUMENTS

JP         2010117946 A      5/2010

OTHER PUBLICATIONS

Anonymous: "Blob Tracking", RoboRealm, May 1, 2009, XP55405440, Retrieved from the Internet: URL:http://www.roborealm.com/help/Blob_Tracking.php [retrieved on Sep. 11, 2017], 7 pages.

(Continued)

*Primary Examiner* — Tahmina N Ansari
(74) *Attorney, Agent, or Firm* — Polsinelli

(57) ABSTRACT

Techniques and systems are provided for maintaining lost blob trackers for one or more video frames. In some examples, one or more blob trackers maintained for a sequence of video frames are identified. The one or more blob trackers are associated with one or more blobs of the sequence of video frames. A transition of a blob tracker from a first type of tracker to a lost tracker is detected at a first video frame. For example, the blob tracker can be transitioned from the first type of tracker to the lost tracker when a blob for which the blob tracker was associated with in a previous frame is not detected in the first video frame. A recovery duration is determined for the lost tracker at the first video frame. For one or more subsequent video frames obtained after the first video frame, the lost tracker is removed from the one or more blob trackers maintained for the sequence of video frames when a lost duration for the lost tracker is greater than the recovery duration. The blob tracker can be transitioned back to the first type of tracker if the lost tracker is associated with a blob in a subsequent video frame prior to expiration of the recovery duration.

(Continued)

Trackers and associated blobs are output as identified blob tracker-blob pairs when the trackers are converted from new trackers to trackers of the first type.

28 Claims, 15 Drawing Sheets

(51) Int. Cl.
*G06T 7/70* (2017.01)
*G06T 7/246* (2017.01)

(52) U.S. Cl.
CPC ............... *G06K 9/00771* (2013.01); *G06T 2207/10016* (2013.01); *G06T 2207/30232* (2013.01); *G06T 2207/30241* (2013.01); *G06T 2210/12* (2013.01)

(56) References Cited

U.S. PATENT DOCUMENTS

| | | | |
|---|---|---|---|
| 8,615,105 B1 | 12/2013 | Cheng et al. | |
| 9,253,503 B2 | 2/2016 | Bernal et al. | |
| 2006/0268111 A1* | 11/2006 | Zhang | G01S 3/7864 348/169 |
| 2008/0118106 A1* | 5/2008 | Kilambi | G06K 9/00362 382/103 |
| 2013/0024299 A1* | 1/2013 | Wong | G06Q 30/06 705/15 |
| 2015/0104067 A1 | 4/2015 | Liu | |
| 2015/0310273 A1* | 10/2015 | Shreve | G06K 9/00624 382/103 |
| 2016/0133022 A1 | 5/2016 | Sarkis et al. | |
| 2018/0046863 A1* | 2/2018 | Chen | G06T 7/11 |

OTHER PUBLICATIONS

Anonymous: "Multiple Object Tracking—Matlab & Simulink—MathWorks Deutschland", WayBackMachine, Apr. 13, 2016, XP55405194, Retrieved from the Internet: URL:https://web.archive.org/web/20160413115204/https://de.mathworks.com/help/vision/ug/multiple-object-tracking.html [retrieved on Sep. 8, 2017], 3 pages.

Anonymous: "Tracking Pedestrians from a Moving Car—Matlab Examples", Mathworks, Apr. 22, 2016, XP55405196, Retrieved from the Internet: URL:https://web.archive.org/web/20160422060400/https://www.mathworks.com/examples-matlab-computer-vision/mw/vision_product-PedestrianTrackingFromMovingCameraExample-tracking-pedestrians-from-a-moving-car [retrieved on Sep. 8, 2017], 11 pages.

Apewokin S., et al., "Tracking Multiple Pedestrians in Real-Time Using Kinematics", Computer Vision and Pattern Recognition Workshops, IEEE Computer Society, Jun. 23, 2008, XP031285705, pp. 1-6.

International Search Report and Written Opinion—PCT/US2017/035483—ISA/EPO—dated Sep. 22, 2017.

Lei B., et al., "Real-Time Outdoor Video Surveillance With Robust Foreground Extraction and Object Tracking via Multi-State Transition Management", Pattern Recognition Letters, Nov. 1, 2006, vol. 27. No. 15, XP027922601, ISSN: 0167-8655, pp. 1816-1825.

\* cited by examiner

1100C

1100D

1300

IDENTIFY ONE OR MORE BLOB TRACKERS MAINTAINED FOR A SEQUENCE OF VIDEO FRAMES, WHEREIN THE ONE OR MORE BLOB TRACKERS ARE ASSOCIATED WITH ONE OR MORE BLOBS OF THE SEQUENCE OF VIDEO FRAMES, THE ONE OR MORE BLOBS INCLUDING PIXELS OF AT LEAST A PORTION OF ONE OR MORE FOREGROUND OBJECTS IN THE SEQUENCE OF VIDEO FRAMES
1302

DETECT A TRANSITION OF A BLOB TRACKER FROM A FIRST TYPE OF TRACKER TO A LOST TRACKER, WHEREIN THE BLOB TRACKER IS TRANSITIONED FROM THE FIRST TYPE OF TRACKER TO THE LOST TRACKER WHEN A BLOB FOR WHICH THE BLOB TRACKER WAS ASSOCIATED WITH IN A PREVIOUS FRAME IS NOT DETECTED IN A FIRST VIDEO FRAME
1304

DETERMINE A RECOVERY DURATION FOR THE LOST TRACKER AT THE FIRST VIDEO FRAME, WHEREIN, FOR ONE OR MORE SUBSEQUENT VIDEO FRAMES OBTAINED AFTER THE FIRST VIDEO FRAME, THE LOST TRACKER IS REMOVED FROM THE ONE OR MORE BLOB TRACKERS MAINTAINED FOR THE SEQUENCE OF VIDEO FRAMES WHEN A LOST DURATION FOR THE LOST TRACKER IS GREATER THAN THE RECOVERY DURATION
1306

FIG. 13

METHODS AND SYSTEMS OF MAINTAINING LOST OBJECT TRACKERS IN VIDEO ANALYTICS

CROSS-REFERENCE TO RELATED APPLICATIONS

This application claims the benefit of U.S. Provisional Application No. 62/374,284, filed Aug. 12, 2016, which is hereby incorporated by reference, in its entirety.

FIELD

The present disclosure generally relates to video analytics, and more specifically to techniques and systems for maintaining lost object trackers in video analytics.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption.

Video analytics, also referred to as Video Content Analysis (VCA), is a generic term used to describe computerized processing and analysis of a video sequence acquired by a camera. Video analytics provides a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. In some cases, video analytics can send alerts or alarms for certain events of interest. More advanced video analytics is needed to provide efficient and robust video sequence processing.

BRIEF SUMMARY

In some embodiments, techniques and systems are described for maintaining lost object trackers (or blob trackers) in video analytics. In some examples, using video analytics, blob detection can be performed for one or more video frames to generate or identify blobs for the one or more video frames. A blob represents at least a portion of one or more objects in a video frame (also referred to as a "picture"). Temporal information of the blobs can be used to identify stable objects or blobs so that a tracking layer can be established. For example, a blob detected for an object in a video frame can be tracked using a blob tracker when the motion status of the blob is relatively stable. However, in some cases, it is possible for a moving object in a scene to stop moving, become occluded, or to leave the scene, in which case the object becomes lost. In such cases, the blob detected for the object and the blob tracker also become lost.

When a tracked object becomes lost and is then detected and tracked again, the identification of the object might be misaligned since the object, even though it is the same, may not be recognized by the video analytics as the same object (thus with the same blob tracker identifier). Such a scenario can lead to a many new objects or even output events (e.g., an alert, or other event) being created at the system level, greatly impacting the tracking performance of the video analytics. Using the techniques and systems described herein, when an object (and blob) is detected again after being lost, a lost tracker that was associated with the object (and blob) before it was lost can be matched with the object again.

According to at least one example, a method of maintaining lost blob trackers for one or more video frames is provided that includes identifying one or more blob trackers maintained for a sequence of video frames. The one or more blob trackers are associated with one or more blobs of the sequence of video frames. The one or more blobs include pixels of at least a portion of one or more foreground objects in the sequence of video frames. The method further includes detecting a transition of a blob tracker from a first type of tracker to a lost tracker, wherein the blob tracker is transitioned from the first type of tracker to the lost tracker when a blob for which the blob tracker was associated with in a previous frame is not detected in a first video frame. The first video frame can be referred to as a transition-to-lost video frame of the blob tracker, which is a frame for which the blob tracker is detected to be lost. The method further includes determining a recovery duration for the lost tracker at the first video frame. For one or more subsequent video frames obtained after the first video frame, the lost tracker is removed from the one or more blob trackers maintained for the sequence of video frames when a lost duration for the lost tracker is greater than the recovery duration.

In another example, an apparatus is provided that includes a memory configured to store video data and a processor. The processor is configured to and can identify one or more blob trackers maintained for a sequence of video frames. The one or more blob trackers are associated with one or more blobs of the sequence of video frames. The one or more blobs include pixels of at least a portion of one or more foreground objects in the sequence of video frames. The processor is configured to and can detect a transition of a blob tracker from a first type of tracker to a lost tracker, wherein the blob tracker is transitioned from the first type of tracker to the lost tracker when a blob for which the blob tracker was associated with in a previous frame is not detected in a first video frame. The processor is configured to and can determine a recovery duration for the lost tracker at the first video frame. For one or more subsequent video frames obtained after the first video frame, the lost tracker is removed from the one or more blob trackers maintained for the sequence of video frames when a lost duration for the lost tracker is greater than the recovery duration.

In another example, a computer readable medium is provided having stored thereon instructions that when executed by a processor perform a method that includes: identifying one or more blob trackers maintained for a sequence of video frames, wherein the one or more blob trackers are associated with one or more blobs of the sequence of video frames, the one or more blobs including pixels of at least a portion of one or more foreground objects in the sequence of video frames; detecting a transition of a blob tracker from a first type of tracker to a lost tracker, wherein the blob tracker is transitioned from the first type of tracker to the lost tracker when a blob for which the blob tracker was associated with in a previous frame is not detected in a first video frame; and determining a recovery duration for the lost tracker at the first video frame, wherein, for one or more subsequent video frames obtained after the first video frame, the lost tracker is removed from the one or more blob trackers maintained for the sequence of video frames when a lost duration for the lost tracker is greater than the recovery duration.

In another example, an apparatus is provided that includes means for identifying one or more blob trackers maintained for a sequence of video frames. The one or more blob trackers are associated with one or more blobs of the sequence of video frames. The one or more blobs include pixels of at least a portion of one or more foreground objects in the sequence of video frames. The apparatus further comprises means for detecting a transition of a blob tracker from a first type of tracker to a lost tracker, wherein the blob tracker is transitioned from the first type of tracker to the lost tracker when a blob for which the blob tracker was associated with in a previous frame is not detected in a first video frame. The apparatus further comprises means for determining a recovery duration for the lost tracker at the first video frame. For one or more subsequent video frames obtained after the first video frame, the lost tracker is removed from the one or more blob trackers maintained for the sequence of video frames when a lost duration for the lost tracker is greater than the recovery duration.

In some aspects, the methods, apparatuses, and computer readable medium described above further comprise: obtaining a subsequent video frame of the sequence of video frames, wherein the subsequent video frame is obtained later in time than the first video frame; determining the lost duration for the lost tracker, the lost duration including a duration since the transition of the blob tracker from the first type of tracker to the lost tracker; determining the lost duration is greater than the recovery duration for the lost tracker; and removing the lost tracker from the plurality of blob trackers maintained for the sequence of video frames when the lost duration is greater than the recovery duration.

In some aspects, the methods, apparatuses, and computer readable medium described above further comprise: obtaining a subsequent video frame of the sequence of video frames, wherein the subsequent video frame is obtained later in time than the first video frame; associating the lost tracker with a blob in the subsequent video frame; and converting the blob tracker from the lost tracker to the first type of tracker when the lost tracker is associated with the blob and when the lost duration for which the lost tracker is lost is less than the recovery duration.

In some aspects, trackers of the first type and associated blobs are output as identified blob tracker-blob pairs when trackers of the first type are converted from new trackers to trackers of the first type.

In some aspects, the recovery duration of the lost tracker is adaptively set to a value based on a first duration of the blob tracker. The first duration includes a duration the blob tracker was first transitioned to be the first type of tracker until the first video frame. Trackers of the first type and associated blobs are output as identified blob tracker-blob pairs when trackers of the first type are converted from new trackers to trackers of the first type. In some aspects, the recovery duration of the lost tracker is further modified as a minimum value between the first duration and a maximum recovery duration. In some aspects, the first duration is determined based on a global duration of the blob tracker. The global duration includes a duration since the blob tracker is created. In some aspects, the first duration is determined based on the global duration of the blob tracker and a second duration. The second duration includes a duration for converting blob trackers from new trackers to trackers of the first type.

In some aspects, the methods, apparatuses, and computer readable medium described above further comprise: determining a bounding box of the blob tracker is within an exclusion region of the first video frame; and wherein the recovery duration is set as a predetermined value, the predetermined value causing the lost tracker to be removed from the plurality of blob trackers sooner than one or more lost blob trackers with bounding boxes not within the one or more exclusion regions the first video frame. In some aspects, the exclusion region includes a boundary of the first video frame.

In some aspects, the methods, apparatuses, and computer readable medium described above further comprise: determining, for a subsequent video frame of the sequence of video frames, to remove the lost tracker from the plurality of blob trackers when the lost duration for the lost tracker is greater than the recovery duration, wherein the subsequent video frame is obtained later in time than the first video frame.

In some aspects, the lost duration starts when the blob tracker is transitioned from the first type of tracker to the lost tracker in the first video frame, and wherein the recovery duration applies from when the blob tracker is transitioned from the first type of tracker to the lost tracker until the blob tracker is converted to the first type of tracker.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 13 is a flowchart illustrating an example of a process of maintaining blob trackers, in accordance with some embodiments.

DETAILED DESCRIPTION

Figure 1:
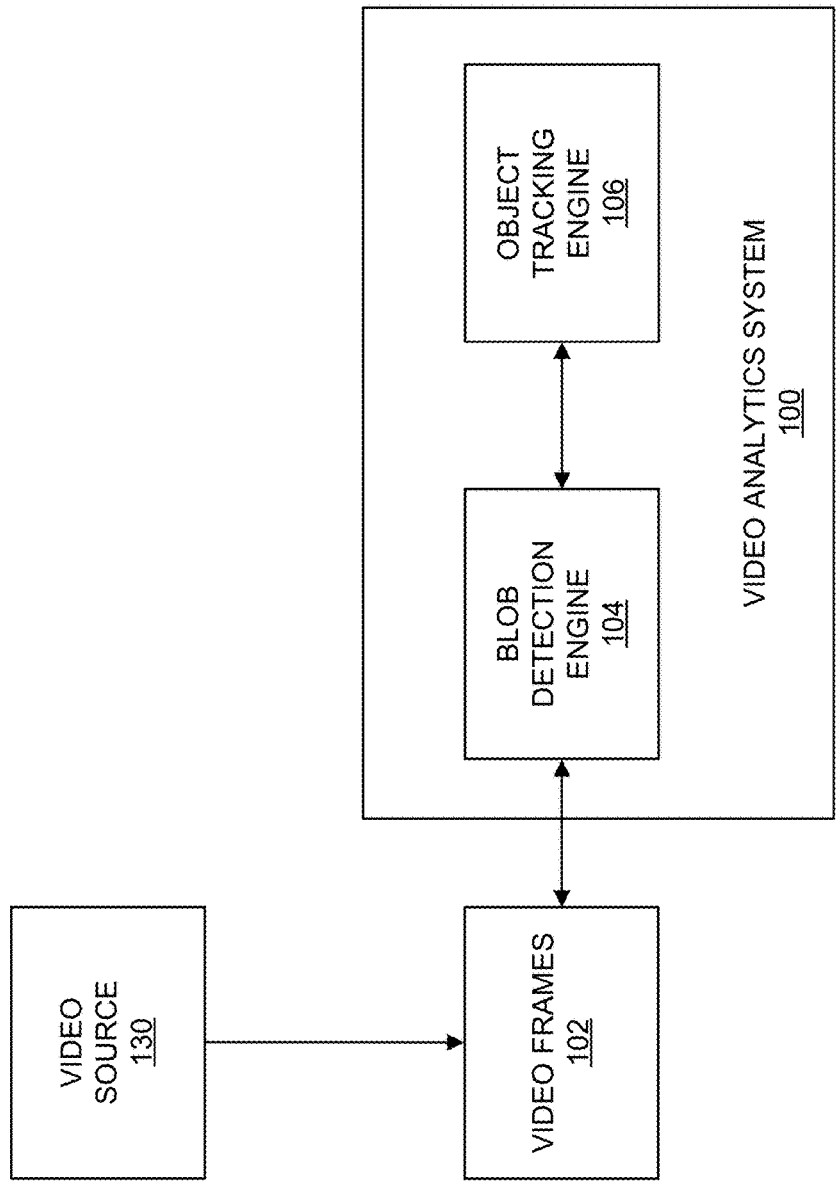
FIG. 1 is a block diagram illustrating an example of a system including a video source and a video analytics system, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a video sequence from a video source and can process the video sequence to provide a variety of tasks. One example of a video source can include an Internet protocol camera (IP camera), or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of event of interest and sends an alert or alarm to a central control room to alert a user of the event of interest.

As noted previously, a video analytics system can generate and detect foreground blobs that can be used to perform various operations, such as object tracking or other operations described above. A blob tracker can be used to track one or more blobs in a video sequence. A blob tracker can start to be associated with a blob in one frame, and can be connected with blobs across one or more subsequent frames. In some cases, it is possible for a moving object to become lost, such as when the object becomes occluded or leaves the scene. In such cases, the blob detected for the object and the blob tracker also become lost. As described in more detail below, systems and methods are described herein for maintaining lost blob trackers so that when an object (and its blob) is detected again after being lost, a lost tracker that was associated with the object (and its blob) before it was lost can be matched with the object again.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple IP cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection engine 104 and an object tracking engine 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking. The blob detection engine 104 can detect one or more blobs in video frames (e.g., video frames 102) of a video sequence, and the object tracking engine 106 can track the one or more blobs across the frames of the video sequence. As used herein, a blob refers to pixels of at least a portion of an object in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding box can be associated with a blob. In some examples, a tracker can also be represented by a tracker bounding box. In the tracking layer, in case there is no need to know how the blob is formulated within a bounding box, the term blob and bounding box may be used interchangeably.

As described in more detail below, blobs can be tracked using blob trackers. A blob tracker can be associated with a tracker bounding box and can be assigned a tracker identifier (ID). In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, a history of the velocity, and a history of location, of continuous frames, for the blob tracker, as described in more detail below.

In some examples, a motion model for a blob tracker can determine and maintain two locations of the blob tracker for each frame. For example, a first location for a blob tracker for a current frame can include a predicted location in the current frame. The first location is referred to herein as the predicted location. The predicted location of the blob tracker in the current frame includes a location in a previous frame of a blob with which the blob tracker was associated. Hence, the location of the blob associated with the blob tracker in the previous frame can be used as the predicted location of the blob tracker in the current frame. A second location for the blob tracker for the current frame can include a location in the current frame of a blob with which the tracker is associated in the current frame. The second location is referred to herein as the actual location. Accordingly, the location in the current frame of a blob associated with the blob tracker is used as the actual location of the blob tracker in the current frame. The actual location of the blob tracker in the current frame can be used as the predicted location of the blob tracker in a next frame. The location of the blobs can include the locations of the bounding boxes of the blobs.

The velocity of a blob tracker can include the displacement of a blob tracker between consecutive frames. For example, the displacement can be determined between the centers (or centroids) of two bounding boxes for the blob tracker in two consecutive frames. In one illustrative example, the velocity of a blob tracker can be defined as $V_t = C_t - C_{t-1}$, where $C_t - C_{t-1} = (C_{tx} - C_{t-1x}, C_{ty} - C_{t-1y})$. The term $C_t(C_{tx}, C_{ty})$ denotes the center position of a bounding box of the tracker in a current frame, with $C_{tx}$ being the x-coordinate of the bounding box, and $C_{ty}$ being the y-coordinate of the bounding box. The term $C_{t-1}(C_{t-1x}, C_{t-1y})$ denotes the center position (x and y) of a bounding box of the tracker in a previous frame. In some implementations, it is also possible to use four parameters to estimate x, y, width, height at the same time. In some cases, because the timing for video frame data is constant or at least not dramatically different overtime (according to the frame rate, such as 30 frames per second, 60 frames per second, 120 frames per second, or other suitable frame rate), a time variable may not be needed in the velocity calculation. In some cases, a time constant can be used (according to the instant frame rate) and/or a timestamp can be used.

Using the blob detection engine 104 and the object tracking engine 106, the video analytics system 100 can perform blob generation and detection for each frame or picture of a video sequence. For example, the blob detection engine 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection engine 104 and the object tracking engine 106 are described with respect to FIGS. 3-4.

Figure 2:
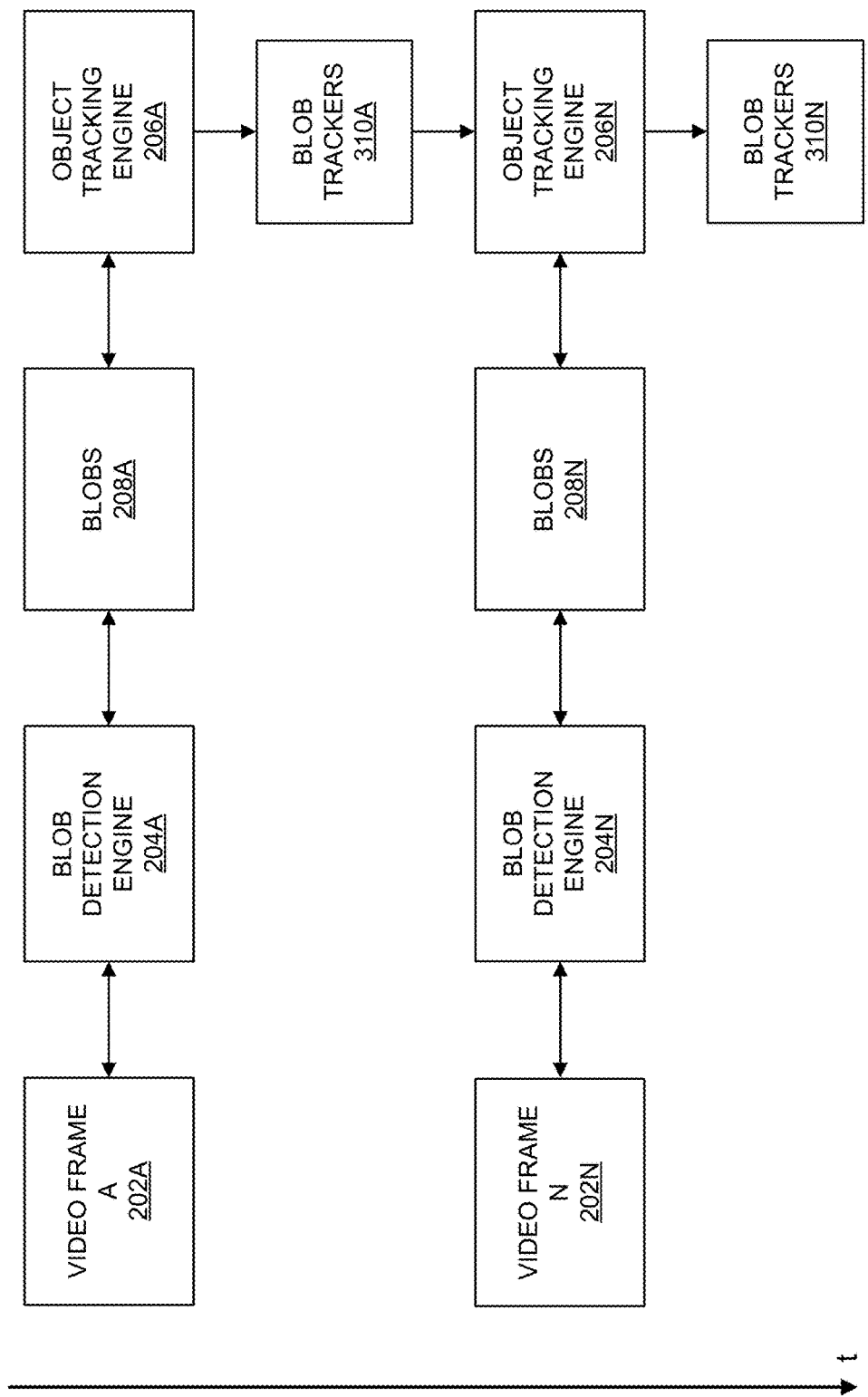
FIG. 2 is an example of a video analytics system processing video frames, in accordance with some embodiments.

FIG. 2 is an example of the video analytics system (e.g., video analytics system 100) processing video frames across time t. As shown in FIG. 2, a video frame A 202A is received by a blob detection engine 204A. The blob detection engine 204A generates foreground blobs 208A for the current frame A 202A. After blob detection is performed, the foreground blobs 208A can be used for temporal tracking by the object tracking engine 206A. Costs (e.g., a cost including a distance, a weighted distance, or other cost) between blob trackers and blobs can be calculated by the object tracking engine 206A. The object tracking engine 206A can perform data association to associate or match the blob trackers (e.g., blob trackers generated or updated based on a previous frame or newly generated blob trackers) and blobs 208A using the calculated costs (e.g., using a cost matrix or other suitable association technique). The blob trackers can be updated, including in terms of positions of the trackers, according to the data association to generate updated blob trackers 310A. For example, a blob tracker's state and location for the video frame A 202A can be calculated and updated. The blob tracker's location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection engine 204N generates foreground blobs 208N for the frame N 202N. The object tracking engine 206N can then perform temporal tracking of the blobs 208N. For example, the object tracking engine 206N obtains the blob trackers 310A that were updated based on the prior video frame A 202A. The object tracking engine 206N can then calculate a cost and can associate the blob trackers 310A and the blobs 208N using the newly calculated cost. The blob trackers 310A can be updated according to the data association to generate updated blob trackers 310N.

Figure 3:
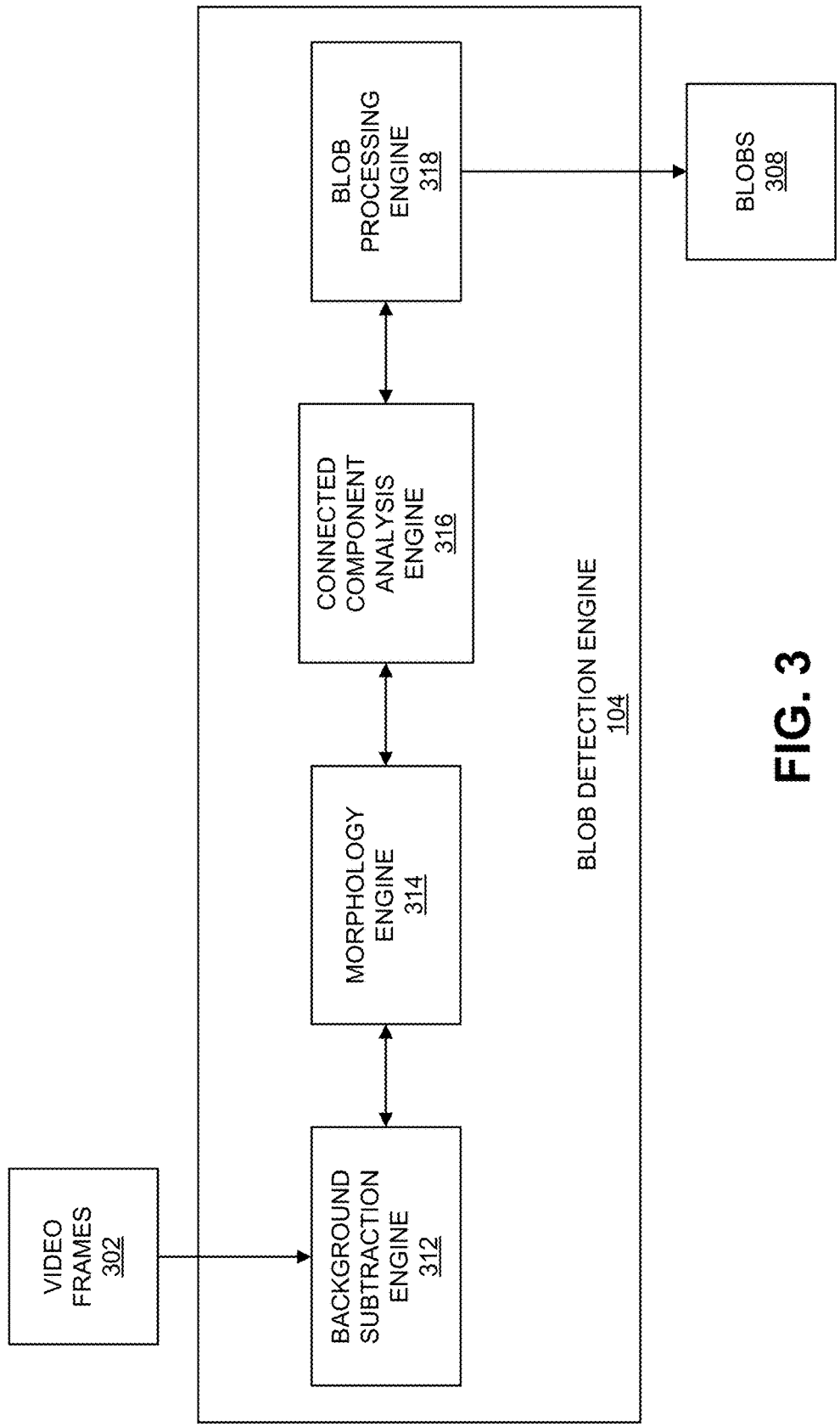
FIG. 3 is a block diagram illustrating an example of a blob detection engine, in accordance with some embodiments.

FIG. 3 is a block diagram illustrating an example of a blob detection engine 104. Blob detection is used to segment moving objects from the global background in a scene. The blob detection engine 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 312 can also perform background subtraction using a mixture of Gaussians (GMM). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N(X_t | \mu_{i,t}, \Sigma_{i,t}) \quad \text{Equation (1)}$$

An equation of the GMM model is shown in equation (1), wherein there are K Gaussian models. Each Guassian model has a distribution with a mean of μ and variance of Σ, and has a weight ω. Here, i is the index to the Gaussian model and t is the time instance. As shown by the equation, the parameters of the GMM change over time after one frame (at time t) is processed.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black.

Using the foreground mask generated from background subtraction, a morphology engine 314 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 314 can apply an erosion function (e.g., FilterErode3×3) to a 3×3 filter window of a center pixel, which is currently being processed. The 3×3 window can be applied to each foreground pixel (as the center pixel) in the foreground mask. One of ordinary skill in the art will appreciate that other window sizes can be used other than a 3×3 window. The erosion function can include an erosion operation that sets a current foreground pixel in the foreground mask (acting as the center pixel) to a background pixel if one or more of its neighboring pixels within the 3×3 window are background pixels. Such an erosion operation can be referred to as a strong erosion operation or a single-neighbor erosion operation. Here, the neighboring pixels of the current center pixel include the eight pixels in the 3×3 window, with the ninth pixel being the current center pixel.

A dilation operation can be used to enhance the boundary of a foreground object. For example, the morphology engine 314 can apply a dilation function (e.g., FilterDilate3×3) to a 3×3 filter window of a center pixel. The 3×3 dilation window can be applied to each background pixel (as the center pixel) in the foreground mask. One of ordinary skill in the art will appreciate that other window sizes can be used other than a 3×3 window. The dilation function can include a dilation operation that sets a current background pixel in the foreground mask (acting as the center pixel) as a foreground pixel if one or more of its neighboring pixels in the 3×3 window are foreground pixels. The neighboring pixels of the current center pixel include the eight pixels in the 3×3 window, with the ninth pixel being the current center pixel. In some examples, multiple dilation functions can be applied after an erosion function is applied. In one illustrative example, three function calls of dilation of 3×3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with 3×3 window size is called first, and three function calls of dilation of 3×3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. One example of the connected component analysis performed by the connected component analysis engine 316 is implemented as follows:

for each pixel of the foreground mask {
  if it is a foreground pixel and has not been processed, the following steps apply:
    Apply FloodFill function to connect this pixel to other foreground and generate a connected component
    Insert the connected component in a list of connected components.
    Mark the pixels in the connected component as being processed}

The Floodfill (seed fill) function is an algorithm that determines the area connected to a seed node in a multi-dimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection engine 104. In some examples, the blob processing engine 318 can perform content-based filtering of certain blobs. For instance, a machine learning method can determine that a current blob contains noise (e.g., foliage in a scene). Using the machine learning information, the blob processing engine 318 can determine the current blob is a noisy blob and can remove it from the resulting blobs that are provided to the object tracking engine 106. In some examples, the blob processing engine 318 can merge close blobs into one big blob to remove the risk of having too many small blobs that could belong to one object. In some examples, the blob processing engine 318 can filter out one or more small blobs that are below a certain size threshold (e.g., an area of a bounding box surrounding a blob is below an area threshold). In some embodiments, the blob detection engine 104 does not include the blob processing engine 318, or does not use the blob processing engine 318 in some instances. For example, the blobs generated by the connected component analysis engine 316, without further processing, can be input to the object tracking engine 106 to perform blob and/or object tracking.

Figure 4:
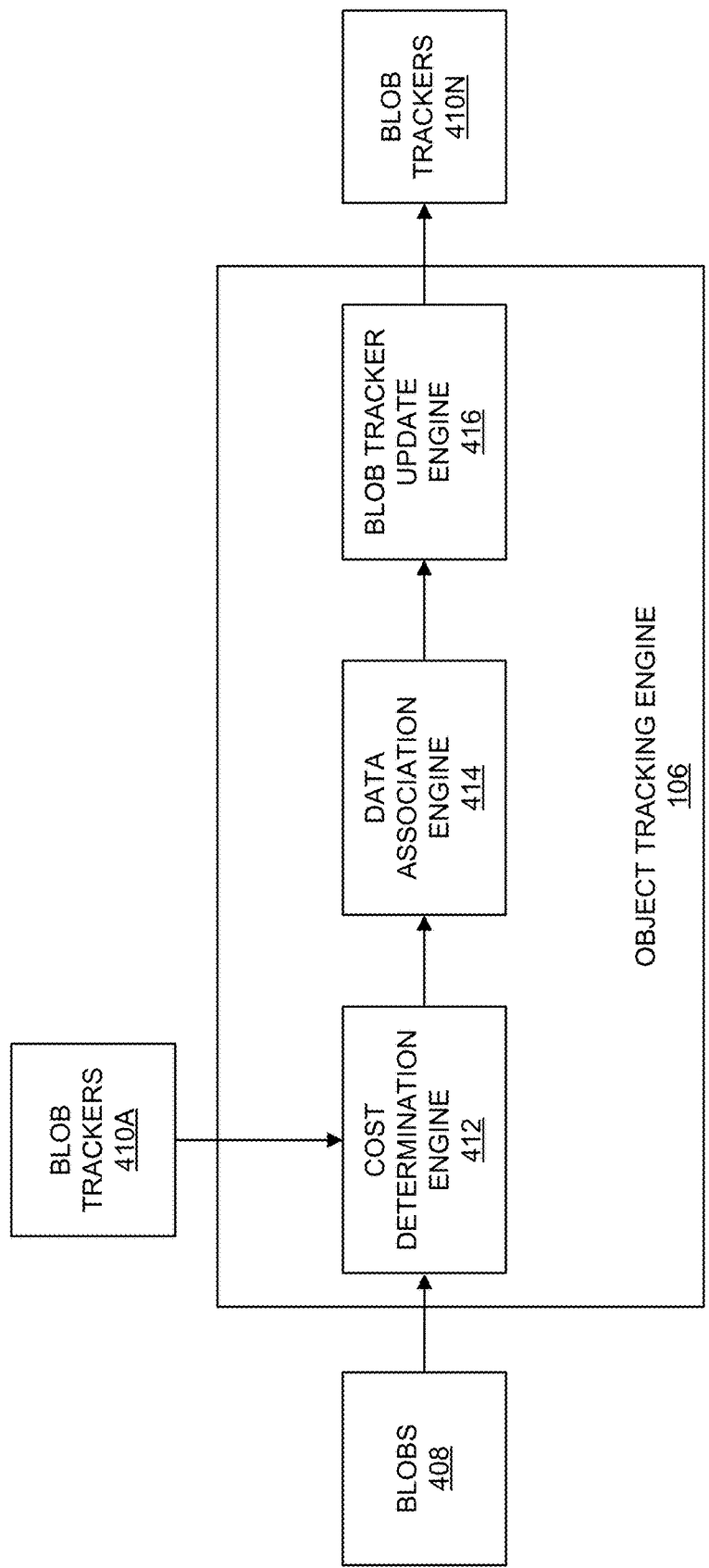
FIG. 4 is a block diagram illustrating an example of an object tracking engine, in accordance with some embodiments.

FIG. 4 is a block diagram illustrating an example of an object tracking engine 106. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking engine 106 can obtain the blobs 408 of a current video frame from the blob detection engine 104. The cost determination engine 412 can also obtain the blob trackers 410A updated from the previous video frame (e.g., video frame A 202A). A cost function can then be used to calculate costs between the object trackers 410A and the blobs 408. Any suitable cost function can be used to calculate the costs. In some examples, the cost determination engine 412 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$Cost_{tb} = \sqrt{(t_x - b_x)^2 + (t_y - b_y)^2}$$

The terms $(t_x, t_y)$ and $(b_x, b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between the trackers 410A and blobs 408 can be determined by identifying the lowest cost tracker-blob pairs in the matrix. For example, the lowest cost between tracker A and the blobs A, B, and C is used to determine the blob with which to associate the tracker A.

Data association between trackers 410A and blobs 408, as well as updating of the trackers 410A, may be based on the determined costs. The data association engine 414 matches or assigns a tracker with a corresponding blob and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible.

Regardless of the association technique that is used, the data association engine 414 can rely on the distance between the blobs and trackers. The location of the foreground blobs are identified with the blob detection engine 104. However, a blob tracker location in a current frame may need to be predicted from a previous frame (e.g., using a location of a blob associated with the blob tracker in the previous frame). The calculated distance between the identified blobs and estimated trackers is used for data association. After the data association for the current frame, the tracker location in the current frame can be identified with the location of its associated blob(s) in the current frame. The tracker's location can be further used to update the tracker's motion model and predict its location in the next frame.

Once the association between the blob trackers 410A and blobs 408 has been completed, the blob tracker update engine 416 can use the information of the associated blobs, as well as the trackers' temporal statuses, to update the states of the trackers 410A for the current frame. Upon updating the trackers 410A, the blob tracker update engine 416 can perform object tracking using the updated trackers 410N, and can also provide the update trackers 410N for use for a next frame.

The state of a blob tracker can include the tracker's identified location (or actual location) in a current frame and its predicted location in the next frame. The state can also, or alternatively, include a tracker's temporal status. The temporal status can include whether the tracker is a new tracker that was not present before the current frame, whether the tracker has been alive for certain frames, or other suitable temporal status. Other states can include, additionally or alternatively, whether the tracker is considered as lost when it does not associate with any foreground blob in the current frame, whether the tracker is considered as a dead tracker if it fails to associate with any blobs for a certain number of consecutive frames (e.g., 2 or more), or other suitable tracker states.

Other than the location of a tracker, there may be other status information needed for updating the tracker, which may require a state machine for object tracking. Given the information of the associated blob(s) and the tracker's own status history table, the status also needs to be updated. The state machine collects all the necessary information and updates the status accordingly. Various statuses can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other objects of interest) intersect, the two trackers associated with the two objects will be merged together for certain frames, and the merge or occlusion status needs to be recorded for high level video analytics.

One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified as its predicted location from the previous frame, meaning that the motion model for the blob tracker is not corrected and the prediction propagates with the blob tracker's last model (from the previous frame).

Regardless of the tracking method being used, a new tracker starts to be associated with a blob in one frame and, moving forward, the new tracker may be connected with possibly moving blobs across multiple frames. When a tracker has been continuously associated with blobs and a duration has passed, the tracker may be promoted to be a normal tracker and output as an identified tracker-blob pair.

A tracker-blob pair is output at the system level as an event (e.g., presented as a tracked object on a display, output as an alert, or other suitable event) when the tracker is promoted to be a normal tracker. In some implementations, a normal tracker (e.g., including certain status data of the normal tracker, the motion model for the normal tracker, or other information related to the normal tracker) can be output as part of object metadata. The metadata, including the normal tracker, can be output from the video analytics system (e.g., an IP camera running the video analytics system) to a server or other system storage. The metadata can then be analyzed for event detection (e.g., by rule interpreter). A tracker that is not promoted as a normal tracker can be removed (or killed), after which the tracker can be considered as dead.

As described above, blob detection can be performed for one or more video frames to generate or identify blobs for the one or more video frames. A blob detected for an object in a video frame can be tracked using a blob tracker when the motion status of the blob is relatively stable. For example, a cost (e.g., a distance) between the blob trackers and blobs can be calculated, and data association can be performed to associate the trackers and blobs using the calculated costs (e.g., using a cost matrix). The blob trackers can then be updated according to the data association, in which case the updated state and location can be calculated and the tracking of the current frame can be fulfilled. In some cases, one or more moving objects in a scene can stop moving, become occluded, or leave the scene, in which case the objects become lost. When an object is lost, the blob detected for the object and the associated blob tracker also become lost. For example, a normal tracker is considered to be a lost tracker if, for the current frame, the tracker does not match any blob and thus it loses its tracking.

When a tracked object becomes lost and is then detected and tracked again, the identification of the object might be misaligned. For example, since the object, even though it is the same, may not be recognized by the video analytics as the same object (thus with the same identifier). Such a scenario can lead to a many new objects or even output events (e.g., an alert, or other event) being created at the system level, greatly impacting the tracking performance of the video analytics. It is difficult to manage lost trackers, and if a lost tracker cannot be re-identified, many problems can arise.

In some examples, problems can arise when an object is detected as multiple different objects. For example, if a moving object's motion trajectory is not always continuous since its creation, the object may be detected as multiple different objects. The object may be detected as multiple different objects when an object is detected, is then lost, and is then detected again. The situation when an object is lost and then found again can be referred to as a break point. When the object is detected again, the object may be associated with a different blob tracker with a different blob identifier (ID) than the blob tracker the object was associated with before it was lost. This causes at least two drawbacks. For example, from the system perspective, one object may lead to just one event being finally reported by the video analytics, but if the trajectory of an object has two to three break points, three to four events are reported to the system compared to one. Such increase in events may be interpreted by the system as an increase in false positives, a large drop in tracking accuracy, or other significant situation that can be detrimental to the video analytics system.

Another drawback is that the per-frame tracking accuracy may be diminished. For example, a new blob tracker typically must be continuously associated with one or more blobs for a new-to-normal duration (referred to as T1) before being converted to a normal blob tracker. When a tracker has been continuously associated with blobs and the new-to-normal duration has passed, the tracker may be promoted to be a normal tracker and then output as an identified tracker-blob pair. A tracker-blob pair is output at the system level as an event (e.g., presented as a tracked object on a display, output as an alert, or other suitable event) when the tracker is promoted to be a normal tracker. If there is no way to identify back lost blob trackers, then a blob tracker for an object after a break point cannot be turned back to a normal tracker immediately since it typically takes the new-to-normal duration to convert the tracker to normal and thus output the tracker as a tracker-blob pair. Therefore, a re-identified object after a break point has a duration of missing detection (equivalent to the new-to-normal duration) from the system perspective.

Figure 5:
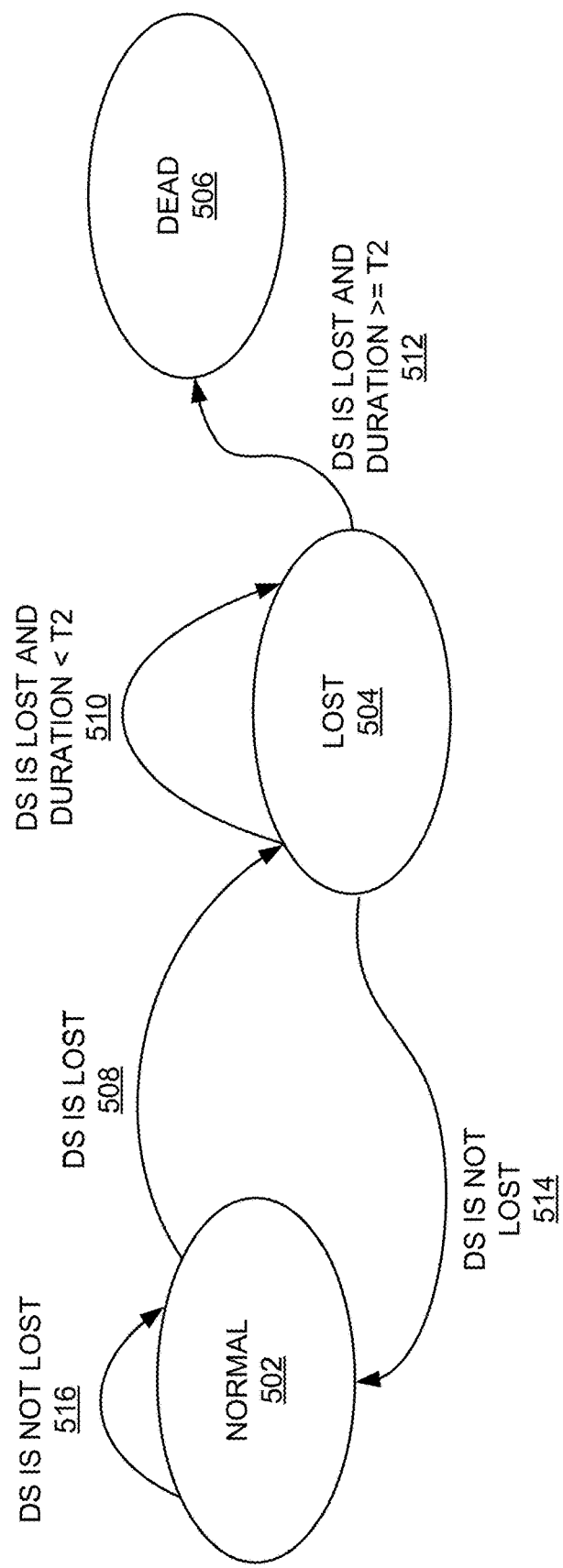
FIG. 5 is a state diagram illustrating an example of a basic lost tracker management process, in accordance with some embodiments.

In some examples, problems can arise using a simple lost tracker duration threshold (referred to as T2) for a lost tracker that defines how long the lost tracker will be kept alive. FIG. 5 is a state diagram illustrating an example of a basic lost tracker management process for blob trackers. The object tracking engine 106 may perform the lost tracker management process. For example, a blob tracker for a current frame (the current frame being processed) has a normal state 502 (and thus is a normal tracker). A blob tracker with a normal state 502 will maintain the normal state 502 as long as the detected state (DS) of the blob tracker is determined to be not lost, as shown at 516. At a later point, the detected state of the blob tracker is determined at 508 to be a lost state 504. For example, a blob with which the blob tracker is associated in a previous frame may become lost when the object it is generated for in a scene stops, becomes occluded, leaves the scene, or some other event happens that prevents the object from being detected in the current frame. In one illustrative example, when an object stops, it may be detected as background for the current frame, in which case a blob will not be generated for the object for the current frame.

For subsequent frames (frames following the current frame), as shown at 510, the blob tracker will remain in a lost state 504 as long as the blob tracker is lost for a duration less than the lost tracker duration threshold T2 and the detected state of the blob tracker is lost. While the blob tracker has a lost state 504, the object tracking engine 106 can determine, for subsequent frames, whether the detected state of the blob tracker becomes not lost at 514 and can monitor a lost tracker duration threshold T2. For example, a blob tracker can be detected as not being lost any longer when it is associated with another blob. In this case, the lost tracker can become a normal tracker immediately. If, within the lost tracker duration threshold T2, the state of the tracker is detected as not lost at 514, the blob tracker can be converted back to a normal state 502. However, if the lost tracker maintains a detected state of lost and the duration the tracker has been lost is greater than or equal to (or in some cases, only greater than) the lost tracker duration threshold T2, as shown at 512, the blob tracker is transitioned to a dead state 506 and is removed from the trackers maintained by the video analytics system.

However, using such as simple lost tracker duration threshold T2 can be problematic and may not work properly in some situations. In one example, there are noisy blob trackers (that track false positive objects) that can occur in similar locations. Therefore, once a noisy blob tracker is lost, and after a certain duration less than T2 a new tracker is identified, the noisy tracker will be alive again. This may lead to more and more false positive objects being tracked, especially if the lost tracker duration threshold T2 is not extremely small. Experiments show that even if the lost tracker duration threshold T2 is less than 30 frames, numerous false positives may be identified. In another example, a blob tracker may track an object (e.g., a person) that passes by a huge background object (e.g., a building or truck), and thus may become lost for a long duration. Therefore, in some cases, even a large lost tracker duration threshold T2 value (e.g., 150 frames, 200 frames, or other large number) may not be sufficient to maintain such a tracker.

Furthermore, the duration of a tracker is typically reset after its status is changed (e.g., from a new tracker to a normal tracker, from a normal tracker to a lost tracker, from a lost tracker to a normal tracker, or the like). When an object is far from the camera and/or has an appearance close to the background, the object can only be detected from time to time. In one illustrative example, such an object may only be detected as foreground every 2-3 consecutive frames, followed by a gap of 3-8 consecutive frames for which the object may not be detected. In such a case, a simple lost duration (e.g., with a fix value assigned to all trackers) may fail since, in order to reduce the false positive rate, such a fixed lost duration must be set to be a very small value, in which case a tracker (as mentioned above), even after it has turned into normal may be killed too often because a short period of loss tracking may already be larger than the duration. Therefore, such an object will have to be restarted as a new tracker one it is detected again, which can take, for example, one second of continuous detection to be picked-up again to be a normal tracker, whose output can be part of the whole system.

Systems and methods are described herein for maintaining lost blob trackers (or object trackers) so that when an object (and blob) is detected again after being lost, a lost tracker that was associated with the object (and blob) before it was lost can be matched with the object again. In addition, with the proposed methods, stable trackers associated with real objects may be much easier to be recovered (with the same tracker ID) even if the objects have gone across occlusion areas or have stayed still for a long while (in which case the trackers may also be lost). In some examples, the object tracking engine 106 can perform the methods described herein. The proposed techniques may work independently or jointly to improve object tracking.

Figure 6:
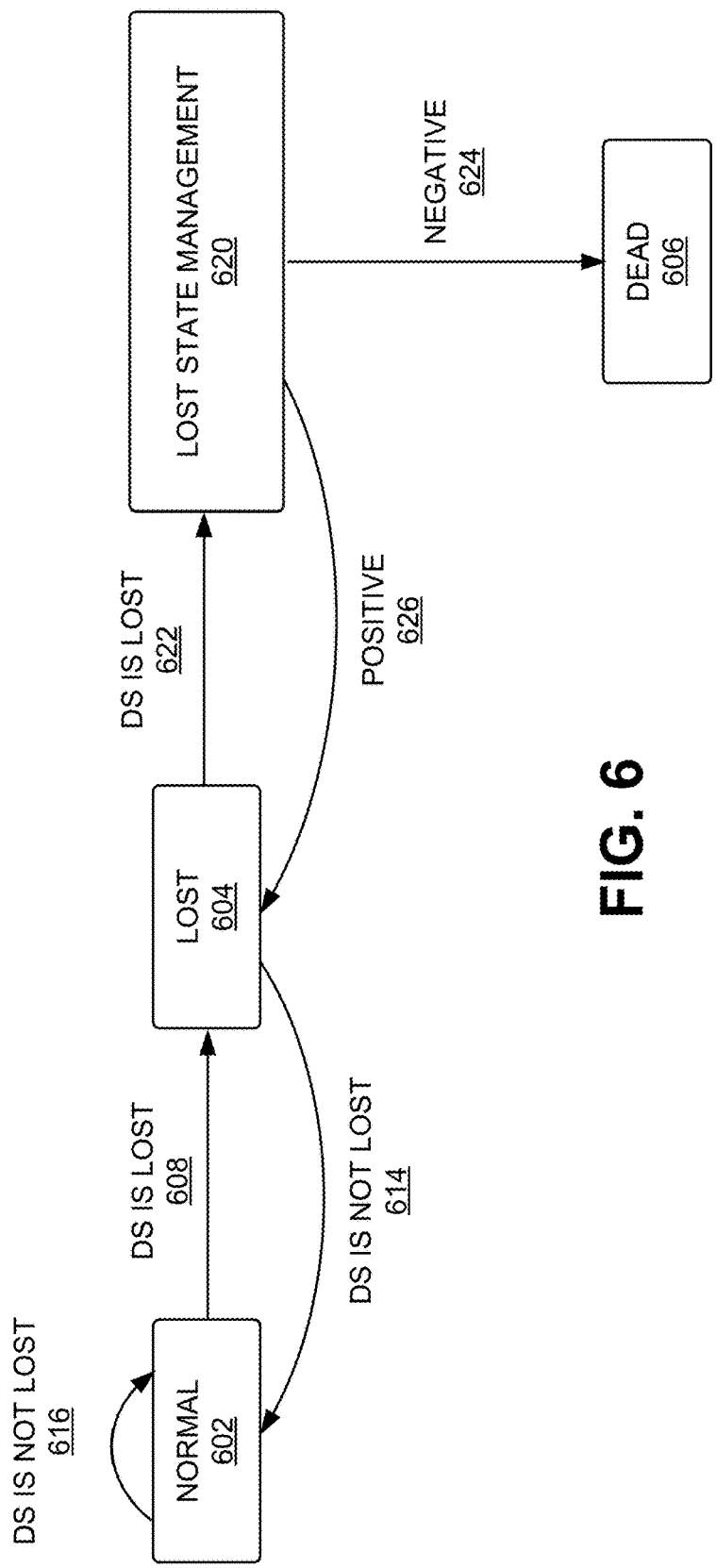
FIG. 6 is a state diagram illustrating an example of lost tracker management process using lost state management, in accordance with some embodiments.

FIG. 6 is a state diagram illustrating an example of lost tracker management using a lost state management process 606. A blob tracker for a current frame has a normal state 602. Once detected, a normal tracker will keep its state unchanged until it becomes lost. For example, a blob tracker with a normal state 602 will maintain the normal state 602 as long as the detected state (DS) of the blob tracker is determined to be not lost, as shown at 616. At a later point in time, the detected state of the blob tracker can be determined at 608 to be a lost state 604. A normal tracker can be considered to be a lost tracker if, for the current frame, the tracker does not match any blob. The video frame a blob tracker is transitioned to a lost tracker can be referred to herein as the transition-to-lost video frame for the lost tracker. For example, a blob the blob tracker is associated with in a previous frame may become lost when the object it is generated for in a scene stops, becomes occluded, leaves the scene, or some other event happens that prevents the object from being detected in the current frame.

For subsequent frames (frames following the current frame), the blob tracker will remain in a lost state 604 while the lost management process 620 is performed or until the detected state of the blob tracker becomes not lost at 614. Whenever the state of the blob tracker is detected to be lost, the lost state management process 620 is invoked. The lost state management process 620 can be used to determine relevant parameters that are used to determine whether the tracker should be kept lost 604 or transitioned to the dead state 606. In some cases, if a tracker has not been considered as a normal tracker yet (and is thus a new tracker), and the tracker is then lost, the tracker may be removed immediately. In such cases, only for those trackers that have been converted to normal and are then lost, the state of being lost can be maintained so that the trackers can later be picked-up again and converted back to normal trackers if the trackers are matched with blobs of future frames.

A lost state management engine (not shown) of the object tracking engine 106 can determine whether a lost tracker is positive lost tracker 626 or a negative lost tracker 624. For example, a lost blob tracker can be maintained in a lost state 604 if the engine determines it to be a positive lost tracker or transitioned to a dead state 606 if the engine determines it to be a negative lost tracker. Such a determination process in the lost state management engine is based on a duration the blob tracker has been lost (referred to herein as a lost duration or state duration), the duration since the blob tracker was created (lifetime of the tracker) up until the lost state management process is performed (referred to herein as global duration), and the duration a tracker is turned from a new tracker to a normal tracker (referred to herein as new duration or new-to-normal duration T1). The new-to-normal duration T1 can be a number of frames (e.g., at least N frames) or an amount of time. In one illustrative example, typical trackers can be in a new state for 30 frames (corresponding to approximately 1 second at a frame rate of 30 frame per second (fps)) before being converted to a normal tracker. Any of the durations described herein can be a number of frames, an amount of time, or any other suitable measure of time.

For example, the lost state management engine can determine an adaptive tracker recovery duration (adaDuration) of a lost blob tracker when the tracker was firstly determined to be lost. The adaptive tracker recovery duration can be set to a value based on the lifetime (including the state history) of the blob tracker. The duration the blob tracker has been lost (the lost duration) can be compared to the adaptive tracker recovery duration to determine whether the lost tracker is a positive lost tracker 626 or a negative lost tracker 624. The simple lost tracker duration threshold can thus be replaced by the adaptive tracker recovery duration. The adaptive tracker recovery duration is calculated when a blob tracker becomes lost (the tracker is transitioned from a normal state to the lost state 604). The adaptive tracker recovery duration can be determined for a blob tracker each time the blob tracker is transitioned to the lost state 604. The lost state management engine can set the adaptive tracker recovery duration based on the global duration (gDuration), the new-to-normal duration (newDuration), and a fixed duration referred to as a maximum adaptive tracker recovery duration (and can be denoted as LOST_TRACKER_LONGEST).

In some examples, the adaptive tracker recovery duration for a lost blob tracker is set to be the minimum value between the normal duration (nrmlDuration) of the lost blob tracker and the maximum adaptive tracker recovery duration (denoted as LOST_TRACKER_LONGEST). For example, the adaptive tracker recovery duration can be defined as adaDuration=Min(nrmlDuration, LOST_TRACKER_LONGEST). The normal duration includes the duration the blob tracker was in the normal state 602 before being transitioned to the lost state 604 (before becoming lost). For example, the normal duration includes a duration the blob tracker was first transitioned to be a normal tracker until the transition-to-lost video frame for which the blob tracker is transitioned to a lost tracker. The normal duration can also be referred to as the show duration since it is the amount of time the tracker is shown as an output tracker before becoming lost. The normal duration can be defined as the difference between the global duration and the new-to-normal duration (nrmlDuration=gDuration−newDuration). Such a calculation can accurately determine the normal duration when the blob tracker transitions between the normal state and other states after first becoming a normal tracker. States of a blob tracker can change often. For example, a blob tracker can change from normal to hidden and then to normal gain. In another example, a blob tracker can be normal, lost, and then normal again. Many other state transitions can occur after a blob tracker is converted to a normal tracker.

The adaptive tracker recovery duration can be set to the normal duration when the normal duration is less than (or less than or equal to in some cases) the maximum adaptive tracker recovery duration. However, if the normal duration is larger (or larger than or equal to in some cases) than the given maximum adaptive tracker recovery duration (LOST_TRACKER_LONGEST), the adaptive tracker recovery duration is clipped to the value of the maximum adaptive tracker recovery duration. The maximum adaptive tracker recovery duration can be set to any suitable value that sets the maximum amount of time a blob tracker can be in a lost state before being transitioned to the dead state 606. For example, the maximum adaptive tracker recovery duration can be set to 50 frames, 75 frames, 100 frames, 125 frames, 150 frames, 175 frames, 200 frames, 1 second (corresponding to 30 frames at 30 fps, 60 frames at 60 fps, or other suitable frame rate), 2 seconds, or any other suitable number of frames or amount of time. In one illustrative example, the maximum adaptive tracker recovery duration can be set to 200 frames, corresponding to approximately 7 seconds at 30 fps.

The lost duration of a blob tracker can then be compared to the determined adaptive tracker recovery duration to determine whether the lost tracker is a positive tracker 626 or a negative tracker 624. For example, if the lost duration (or stateDuration) of a lost blob tracker is greater than the adaptive tracker recovery duration (or greater than or equal to in some cases), the lost tracker is derived to be negative 624 and will be set to the dead state 606 and removed from the blob trackers maintained by the video analytics system. Otherwise, if the lost duration of the lost blob tracker is less than the adaptive tracker recovery duration (or less than or equal to in some cases), the lost tracker is derived to be positive 626 and will kept as lost (maintained in the lost state 604) and thus maintained by the video analytics system.

A blob tracker will remain in the lost state 604 as long as the blob tracker is lost for a duration less than (or less than or equal to in some cases) the adaptive tracker recovery duration and the detected state of the blob tracker is lost. While the blob tracker has a lost state 604, the object tracking engine 106 can determine, for subsequent frames, whether the detected state of the blob tracker becomes not lost at 614 and can monitor the adaptive threshold. For example, a blob tracker can be detected as not being lost any longer when it is associated with another blob. If, within the adaptive threshold, the state of the tracker is detected as not lost at 614, the blob tracker can be converted back to a normal state 602. For example, when a lost tracker is determined to match a detected blob (thus detected state is not lost at 614), the blob tracker can become normal immediately, without having to wait the new-to-normal duration T1 typically required to be converted a normal state.

In some examples, a position of a lost tracker can be estimated and used to maintain the location of the blob tracker in each subsequent frame (after the tracker is lost). The position of a lost tracker can be used to maintain the location in cases when the trajectory of an object (and its tracker) is assumed to be consistent. Maintaining the location of the blob tracker allows the blob tracker to be matched to a newly detected blob in a future frame when detected as not lost anymore. For example, when the data association engine 414 matches blob trackers and blobs, the distance between a blob tracker and a blob can used in the cost determination. By maintaining the location of a lost blob tracker based on its position, the blob tracker is more likely to be matched with the corresponding object (the object it was previously associated with) since its cost (distance between bounding boxes) will be minimal with respect to that object.

An advantage of considering the lifetime of a tracker is to set the adaptive tracker recovery duration of a lost tracker so that the blob tracker is positive 626 longer (maintained in the lost state 604 instead of being transitioned to the dead state 606) if the tracker has shown consistent trajectory by being normal for a meaningful duration, indicating the blob tracker is more likely to be a true positive. The new-to-normal duration (the period of a tracker being new) is excluded from use in the adaptive tracker recovery duration calculation, for example, to avoid the chances that a false positive object is picked up by this mechanism. For example, a false positive tracker may likely have a short lifetime even after it has been transitioned to normal status.

In some examples, the position of a blob tracker in a frame (or picture) when it is lost can be considered when determining the adaptive tracker recovery duration. For example, in addition to the duration parameters described above, the adaptive tracker recovery duration may be dependent on whether the current lost tracker is estimated to be in a certain exclusion region of a frame when it is lost. The exclusion region can be any area within a frame, and can be defined by a boundary or edge of the frame or can be a defined exclusion zone (described below). It can be advantageous to consider whether a blob tracker is within an exclusion region of a picture, for example, because an object within an exclusion region may be less likely to be detected again (after being lost) if near the exclusion region. For example, in some cases, it is assumed that objects maintain the trajectory in which they are traveling, and thus objects that are lost in an exclusion region are not likely to return to the frame (and to be converted from lost to normal again). In some examples, when a blob tracker is determined to be in an exclusion region of a frame according to the estimated bounding box location of the lost tracker's blob, an exclusion status (e.g., a boundary status or an exclusion zone status) can be set for the blob tracker (e.g., by setting a boundary flag to a value of 1, or other suitable technique). In some examples, the exclusion status of a blob tracker may only be generated and/or checked for a lost tracker (e.g., when a blob tracker is transitioned from normal to lost).

In such examples, if the current lost tracker is determined to be in an exclusion region of the frame, the adaptive tracker recovery duration is set to be a predetermined value. The predetermined value is set so that the blob tracker will be removed from the maintained blob trackers sooner than lost blob trackers that are not associated with an exclusion region of the current frame. For example, the predetermined value can be set to a very small value (e.g., 3 frames, 4 frames, 5 frames, 6 frames, 10 frames, or other suitable value).

A lost blob tracker can be determined to be in an exclusion region of a frame using any suitable technique. As noted above, an exclusion region is defined by a boundary of a frame or a defined exclusion zone. For example, a lost blob tracker can be determined to be in an exclusion region if the top-left corner or bottom-right corner of the blob tracker's bounding box is outside of the current frame. In such an example, the exclusion region is any area outside of the boundary of the current frame. In another example, an exclusion region can include a exclusion zone defined for frames of a video sequence. When there is a defined exclusion zone, the exclusion status may be extended to the case when the bounding box overlaps with the exclusion zone or totally belongs to the exclusion zone. An exclusion zone may be defined externally or internally as the results of a certain engine within the video analytics (e.g., by the object tracking engine 106, by the lost state management engine, or an engine external to the video analytics system 100). For example, an exclusion zone may be defined to be an area within which any real object is not supposed to be detected, and can include any area of the image. For example, an exclusion zone may contain noisy background areas or background areas with no movement (noise). In one illustrative example, a scene captured by a static camera in an environment can be known to include a large amount of trees in a lower right portion of the camera view. In such an example, the lower right portion of the frames captured by the camera can be defined as an exclusion zone.

Figure 7:
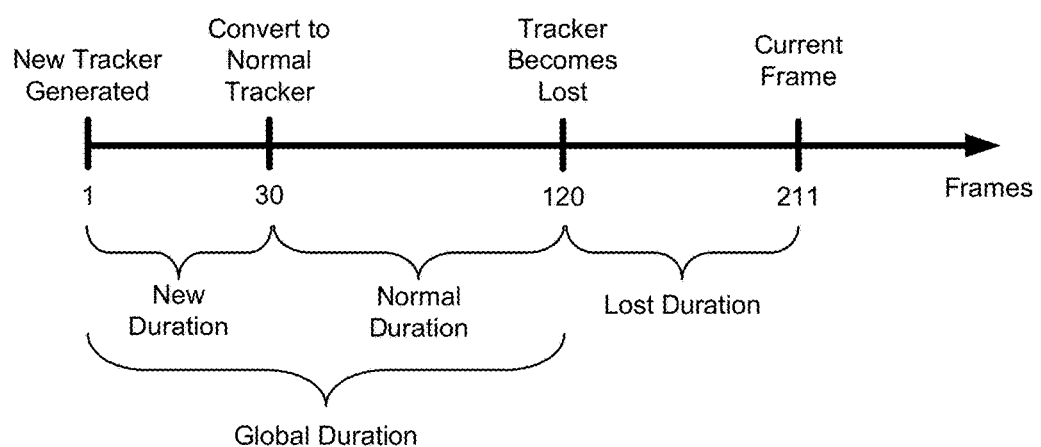
FIG. 7 is a diagram illustrating an example timeline of a blob tracker, in accordance with some embodiments.

FIG. 7 illustrates an example of a timeline of a blob tracker. The timeline shows different state transitions of the blob tracker and various durations that can be used to determine an adaptive tracker recovery duration for the blob tracker when it becomes lost. For example, the object tracking engine 106 generates the blob tracker at frame 1 and assigns the blob tracker with a new state. After being continuously associated with one or more blobs for the new-to-normal duration of 30 frames, the blob tracker is transitioned to a normal tracker with a normal state. While in the normal state, the blob tracker can be monitored to determine if the tracker becomes lost. At frame 120, the object tracking engine 106 determines the blob tracker has become lost and assigns the tracker with a lost state.

The object tracking engine 106 can invoke the lost state management engine when the blob tracker is detected as lost. The lost state management engine can determine an adaptive tracker recovery duration in response to the blob tracker becoming lost. For example, the lost state management engine can obtain the global duration for the blob tracker, corresponding to the duration since the blob tracker was created up until the blob tracker is lost, and the new-to-normal duration for the blob tracker, corresponding to duration it takes to turn a tracker from a new tracker to a normal tracker. In some cases, the new-to-normal duration is a pre-set value for all blob trackers. In some cases, the new-to-normal duration can be unique to one or more blob trackers. The lost state management engine can determine the normal duration (or show duration) for the blob tracker by subtracting the new-to-normal duration from the global duration (nrmlDuration=gDuration−newDuration).

The lost state management engine can set the adaptive tracker recovery duration as the minimum value between the normal duration and the maximum adaptive tracker recovery duration (LOST_TRACKER_LONGEST). In the example of FIG. 7, the maximum adaptive tracker recovery duration is set to 200 frames. In this example, the adaptive tracker recovery duration will be set to the normal duration. Using the duration values shown in FIG. 7 and the value of 200 frames for the maximum adaptive tracker recovery duration, the adaptive tracker recovery duration is set to 90 frames. For example, as shown in FIG. 7, the global duration is 120 frames and the new-to-normal duration is 30 frames, making the normal duration 90 frames. The minimum value between the normal duration (90) and the maximum adaptive tracker recovery duration (200) is the normal duration value of 90, and thus the adaptive tracker recovery duration is set to 90 frames.

The tracking engine 106 can monitor the period the blob tracker has been lost (the tracker's lost duration), and can compare the monitored lost duration to the adaptive tracker recovery duration. As shown in FIG. 7, once the tracker's lost duration reaches 91 frames, it has exceed the adaptive tracker recovery duration. At that point, the tracking engine 106 determines that the blob tracker has been lost for a duration longer than the adaptive tracker recovery duration calculated for the lost blob tracker. The blob tracker can be transitioned to a dead state and removed from the blob trackers maintained by the video analytics system. In some examples, when a blob tracker has been lost for the same duration as the adaptive tracker recovery duration (in which case the condition is the tracker is lost for a duration greater than or equal to the adaptive tracker recovery duration), the blob tracker can be transitioned to a dead state.

Figure 8:
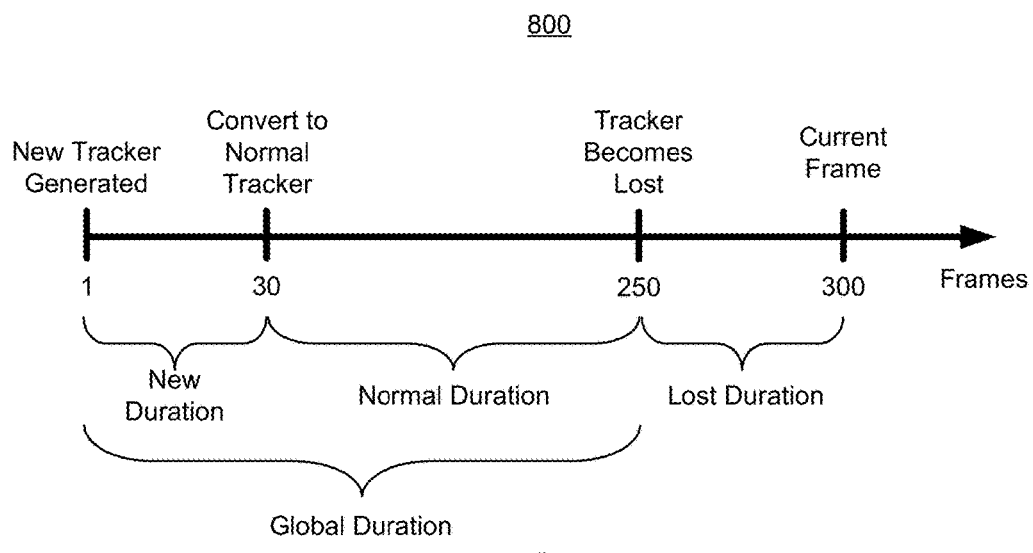
FIG. 8 is a diagram illustrating another example timeline of a blob tracker, in accordance with some embodiments.

FIG. 8 is a diagram illustrating another example timeline of a blob tracker, including different state transitions of the blob tracker and various durations that can be used to determine an adaptive tracker recovery duration for the blob tracker after becoming lost. At frame 1, the object tracking engine 106 generates the blob tracker and assigns the blob tracker with a new state. After being continuously associated with one or more blobs for the new-to-normal duration of 30 frames, the blob tracker is converted to a normal tracker with a normal state. While in the normal state, the blob tracker can be monitored to determine if the tracker becomes lost. At frame 250, the blob tracker becomes lost, at which point the object tracking engine 106 transitions the tracker to a lost state.

The object tracking engine 106 invokes the lost state management engine when the blob tracker is detected as lost. The lost state management engine can determine an adaptive tracker recovery duration for the lost blob tracker in response to the blob tracker becoming lost. For example, the lost state management engine can obtain the global duration for the blob tracker (the duration since the blob tracker was created up until the blob tracker is lost) and the new-to-normal duration for the blob tracker (the duration for converting a tracker from a new to normal). The lost state management engine can then subtract the new-to-normal duration from the global duration to determine the normal duration (or show duration) for the blob tracker by.

The adaptive tracker recovery duration is then set as the minimum value between the normal duration and the maximum adaptive tracker recovery duration (LOST_TRACKER_LONGEST). In the example of FIG. 8, the maximum adaptive tracker recovery duration is set to 200 frames. In this example, the adaptive tracker recovery duration will be set to the maximum adaptive tracker recovery duration. Using the duration values shown in FIG. 8 and the value of 200 frames for the maximum adaptive tracker recovery duration, the adaptive tracker recovery duration is set to 200 frames. For example, as shown in FIG. 8, the global duration is 250 frames and the new-to-normal duration is 30 frames, making the normal duration 220 frames. The minimum value between the normal duration (220) and the maximum adaptive tracker recovery duration (200) is the maximum adaptive tracker recovery duration value of 200, and thus the adaptive tracker recovery duration is set to 200 frames.

The tracking engine 106 can monitor the period the blob tracker has been lost (the tracker's lost duration), and can compare the monitored lost duration to the adaptive tracker recovery duration. For example, as shown in FIG. 8, the tracking engine 106 can check the lost duration of the blob tracker at frame 300, and can determine that the blob tracker has been lost for 50 frames. Based on the lost duration at frame 300, the tracking engine 106 can maintain the lost state of the tracker because the adaptive threshold of 200 frames has not been exceeded. The lost state of the blob tracker can be maintained until either the tracker's detected state becomes not lost and the blob tracker is transitioned to a normal tracker with a normal state, or until frame 451 (or 450 in some instances) is reached and the tracker is transitioned to a dead state due to the blob tracker being lost for a duration greater than (or greater than or equal to in some cases) the adaptive tracker recovery duration of 200. If the blob tracker is transitioned to the dead state, the object tracking engine 106 can remove the tracker from the blob trackers maintained by the video analytics system.

Various examples are described below comparing video sequences for which the adaptive tracker recovery duration is applied to video sequences for which the simple lost tracker duration threshold is applied.

Figure 9A:
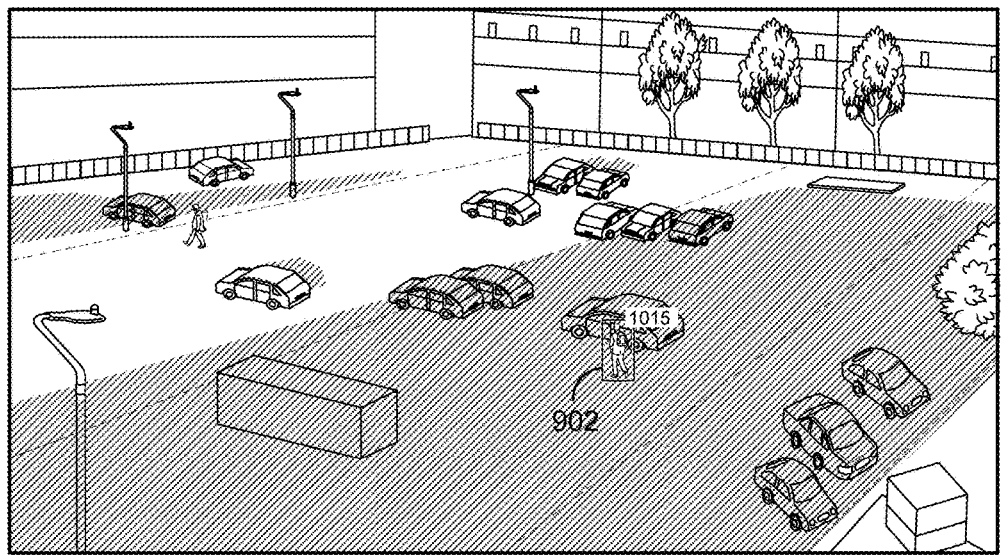
FIG. 9A is an illustration of a video frame of an environment in which an object is tracked, in accordance with some embodiments.
Figure 9B:
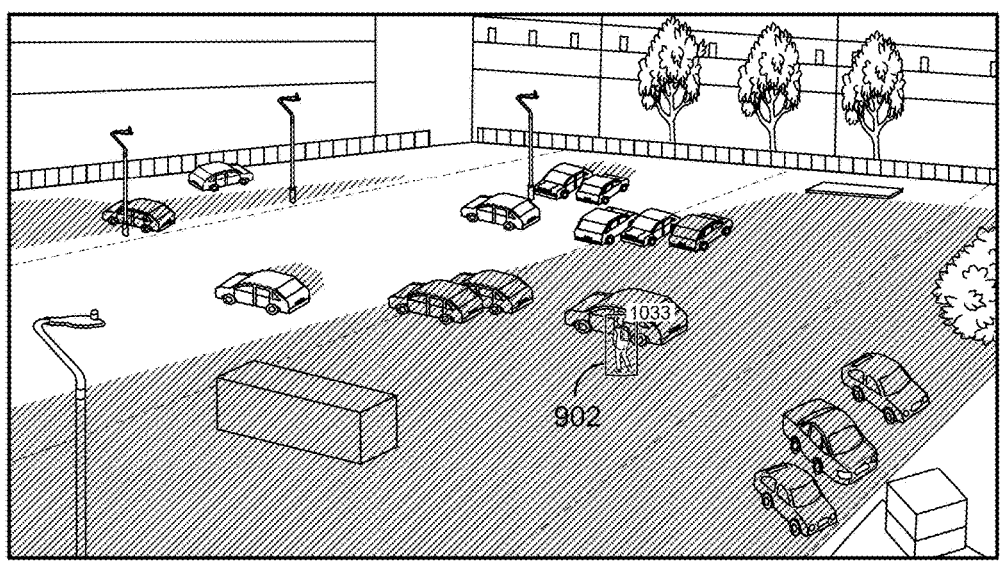
FIG. 9B is an illustration of a video frame of an environment in which the object is tracked after being lost, in accordance with some embodiments.

FIG. 9A and FIG. 9B include a video frame 900A and a video frame 900B of a scene in which a person 902 is tracked. While only the person 902 is shown as being tracked in the video frame 900A for illustrative purposes, many objects could also be tracked. The person 902 in frame 900A is tracked with a blob tracker with ID 1015. At some point the person 902 stops moving, and is detected as background. When the person 902 is detected as background, the blob tracker 1015 becomes lost because it is no longer associated with a blob generated for the person 902.

Once the person 902 begins moving again, at least one blob can be detected for the person 902 and the person 902 can be tracked again. For example, at frame 900B shown in FIG. 9B, the person 902 is again tracked, but this time with a blob tracker with ID 1033. Such a scenario results when the simple lost tracker duration threshold is used, and can lead to multiple new objects and output events (e.g., an alert, or other event) being created at the system level. The simple lost tracker duration threshold may fail because the tracker with ID 1015 may be killed when the threshold expires, causing the new tracker 1033 to be created when the person 902 is tracked again in frame 900B. For example, the video analytics system can interpret the person 902 as two different objects, one object before the person 902 stops and a second object after the person 902 begins moving again.

Figure 10A:
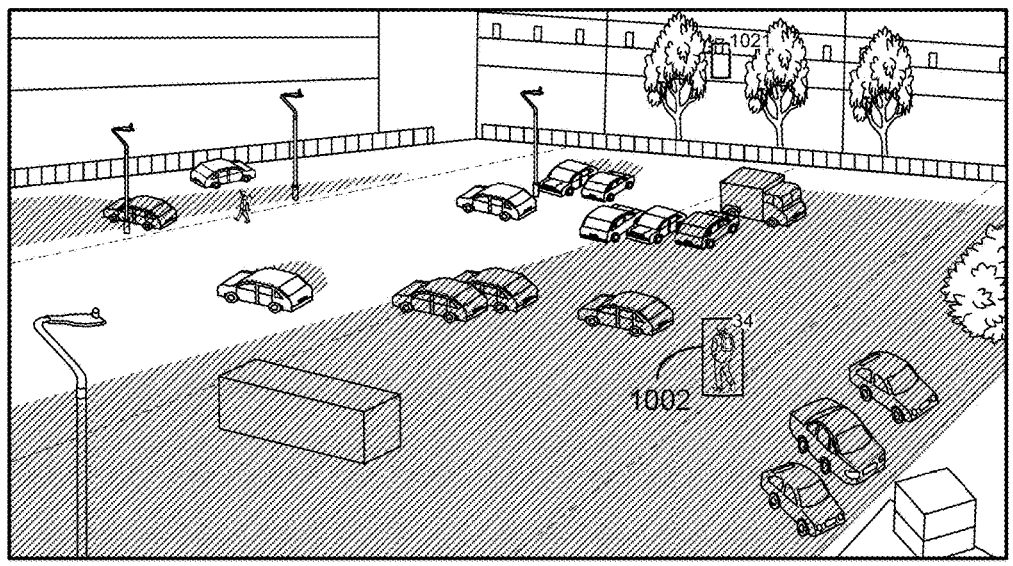
FIG. 10A is an illustration of a video frame of an environment in which an object is tracked, in accordance with some embodiments.
Figure 10B:
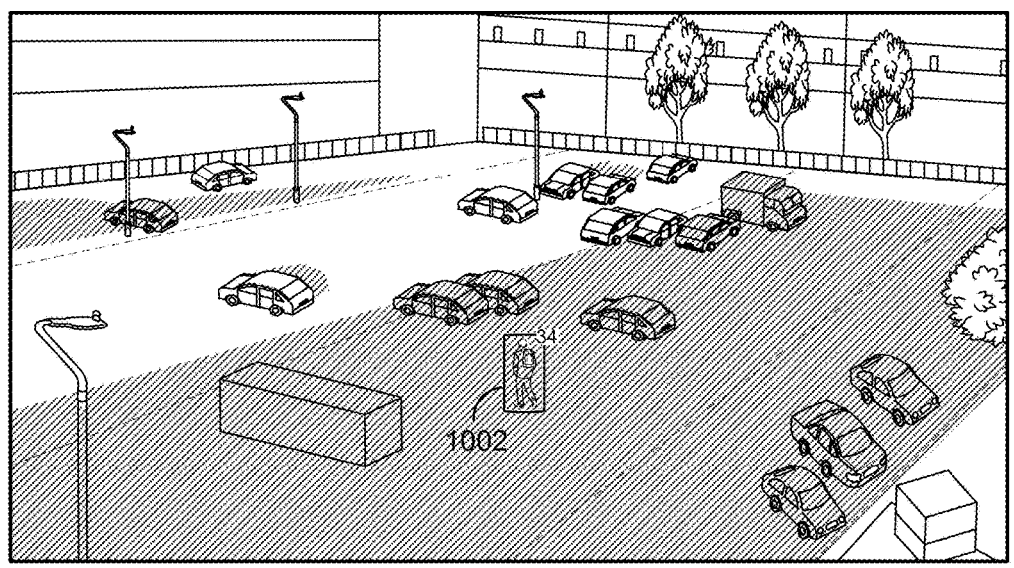
FIG. 10B is an illustration of a video frame of an environment in which the object is tracked after being lost, in accordance with some embodiments.

FIG. 10A and FIG. 10B include a video frame 1000A and a video frame 1000B of a scene in which a person 1002 is tracked. Similar to the scene shown in FIG. 9A and FIG. 9B, the person 1002 is moving, comes to a stop, and begins moving again. For example, in frame 1000A, the person 1002 is tracked with a blob tracker with ID 34. The person 1002 then comes to a stop, at which point the person is detected as background. When the person 1002 is detected as background, the blob tracker 34 becomes lost because it is no longer associated with a blob generated for the person 1002.

The person 1002 then begins moving again, and at least one blob can be detected for the person 1002 and the person 1002 can be tracked again. For example, at frame 1000B shown in FIG. 10B, the person 1002 is again tracked with the same tracker with ID 34. The adaptive duration-based techniques described above (using the adaptive tracker recovery duration) allow the tracker with ID 34 to be kept alive (in a lost state) by the object tracking engine 106 while the person 1002 is stopped, and thus allows the tracker with ID 34 to be associated with the person 1002 again in frame 1000B.

FIG. 11A-FIG. 11D include another example of a sequence of video frames in which the simple lost tracker duration threshold is used. The sequence of video frames include a video frame 1100A, a video frame 1100B, a video frame 1100C, and a video frame 1100D of a scene in which a person 1102 is tracked. The person 1102 in frame 1100A is tracked with a blob tracker with ID 1060. A number of frames later, at frame 1100B shown in FIG. 11B, the person 1102 goes behind a car 1104 and thus disappears from the scene, preventing the person 1102 from being detected in the frame 1100B by the blob detection engine 104. When the person 1102 disappears from the scene, the blob tracker 1160 becomes lost because it is no longer associated with a blob generated for the person 1102.

Figure 11A:
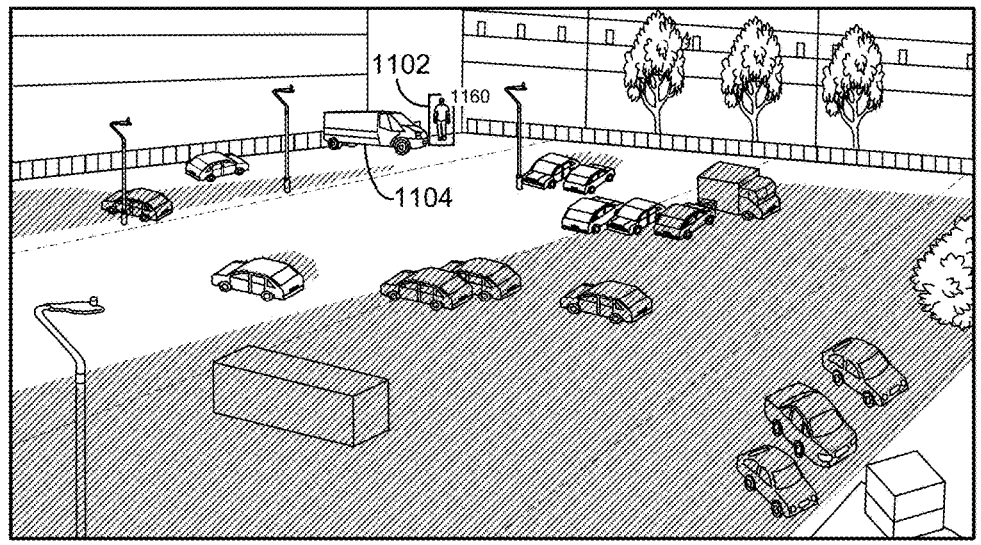
FIG. 11A is an illustration of a video frame of an environment in which an object is tracked, in accordance with some embodiments.
Figure 11B:
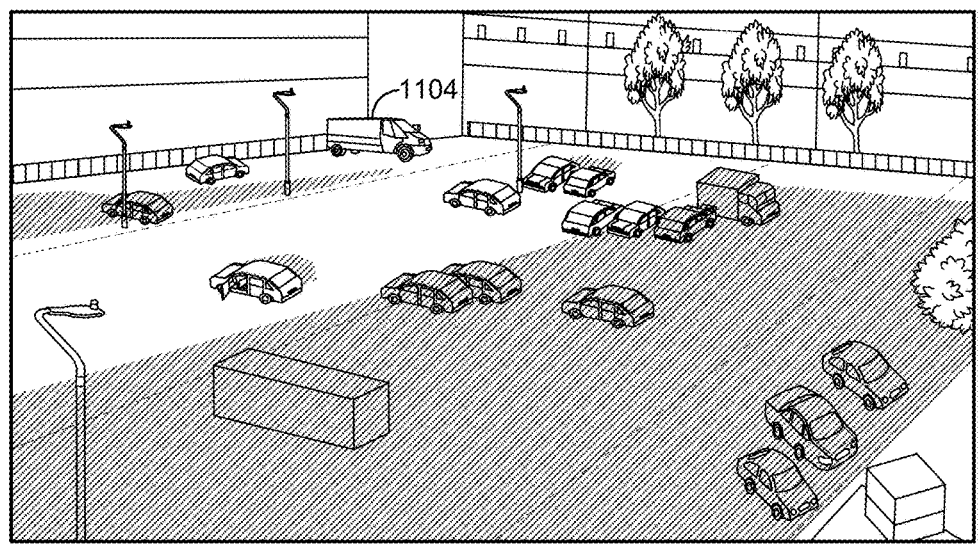
FIG. 11B is an illustration of a video frame of an environment in which the tracked object is lost, in accordance with some embodiments.
Figure 11C:
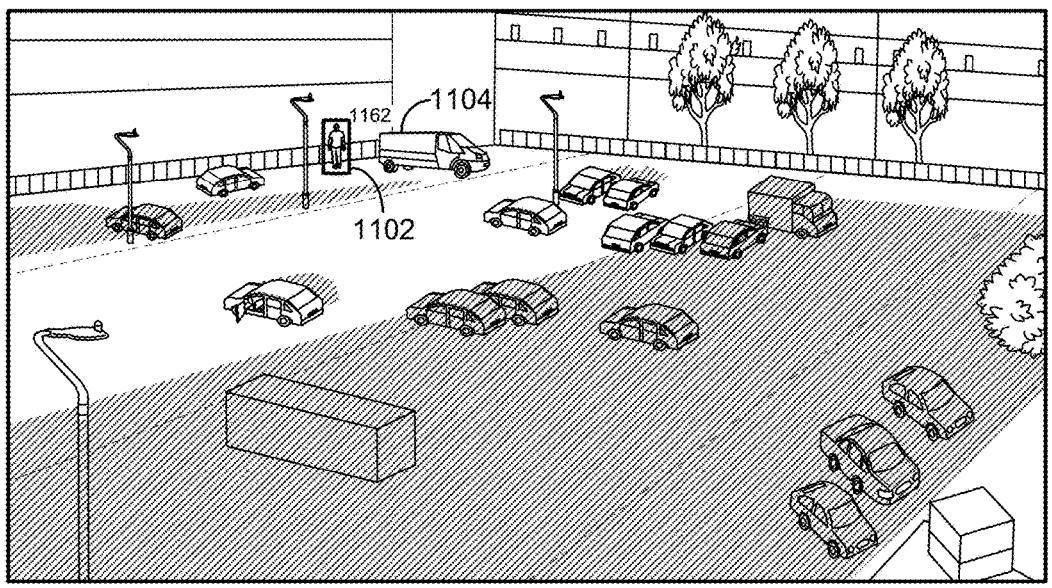
FIG. 11C is an illustration of a video frame of an environment in which an object is tracked after being lost, in accordance with some embodiments.
Figure 11D:
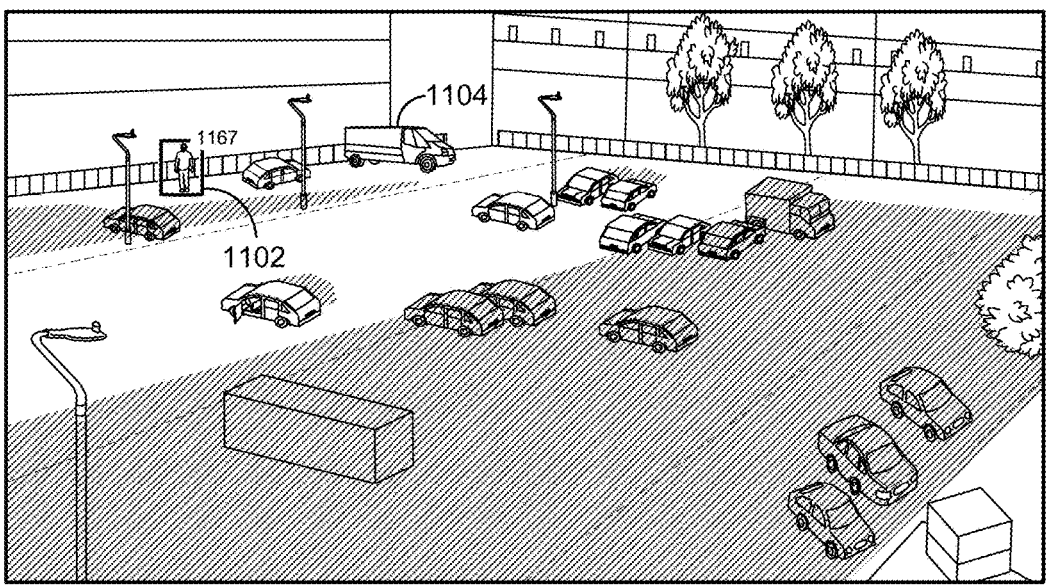
FIG. 11D is an illustration of a video frame of an environment in which the object is tracked after being lost, in accordance with some embodiments.

Some number of frames later, at frame 1100C shown in FIG. 11C, the person 1102 returns to the scene, and at least one blob can be detected for the person 1102. Once a blob is generated for the person 1102 for frame 1110C, the person 1102 can be tracked again by associating a blob tracker with the blob. For example, at frame 1100C, the person 1102 is again tracked, but this time with a blob tracker with ID 1162. At some point, the person 1102 stops moving, and is detected as background. The blob tracker 1162 then becomes lost because it is no longer associated with a blob generated for the person 1102. Once the person 1102 begins moving again, at least one blob can be detected for the person 1102 and the person 1102 can be tracked again. For example, at frame 1100D shown in FIG. 11D, the person 1102 is again tracked, but with an even different blob tracker with ID 1167. The simple lost tracker duration threshold thus leads to numerous new objects being detected.

FIG. 12A-FIG. 12D include a similar scene as that shown in FIG. 11A-FIG. 11D, but this time with the adaptive duration-based technique being applied. The sequence of video frames includes video frame 1200A, a video frame 1200B, a video frame 1200C, and a video frame 1200D of a scene in which a person 1202 is tracked. The person 1202 in frame 1200A is tracked with a blob tracker with ID 159. Some number of frames later, at frame 1200B shown in FIG. 12B, the person 1202 goes behind a car 1204 and disappears from the scene, which prevents the person 1202 from being detected in the frame 1200B by the blob detection engine 104. The blob tracker 159 becomes lost when the person 1202 disappears from the scene because the tracker 159 is no longer associated with a blob generated for the person 1202.

A number of frames later, at frame 1200C shown in FIG. 12C, the person 1202 reappears from behind the car 1204, at which point at least one blob can be detected for the person 1202. Once a blob is generated for the person 1202 for frame 1210C, the person 1202 can be tracked again by associating a blob tracker with the blob. For example, at frame 1200C, the person 1202 is again tracked with the blob tracker with ID 159. Using the adaptive tracker recovery duration, the blob tracker ID 159 is maintained and is re-associated with the person 1202. At some point later in time, the person 1202 stops moving, at which point the person 1202 is detected as a background object. The blob tracker 159 again becomes lost because it is no longer associated with a blob generated for the person 1202. Once the person 1202 begins moving again, at least one blob can be detected for the person 1202 and the person 1202 can be tracked again. For example, at frame 1200D shown in FIG. 12D, the person 1202 is again tracked with the blob tracker with ID 159. The adaptive duration-based techniques described above allow the tracker with ID 159 to be kept alive (in a lost state) by the object tracking engine 106 while the person 1202 is occluded and while the person 1202 is stopped, allowing the tracker with ID 159 to be associated with the person 1202 after numerous break points.

Figure 12A:
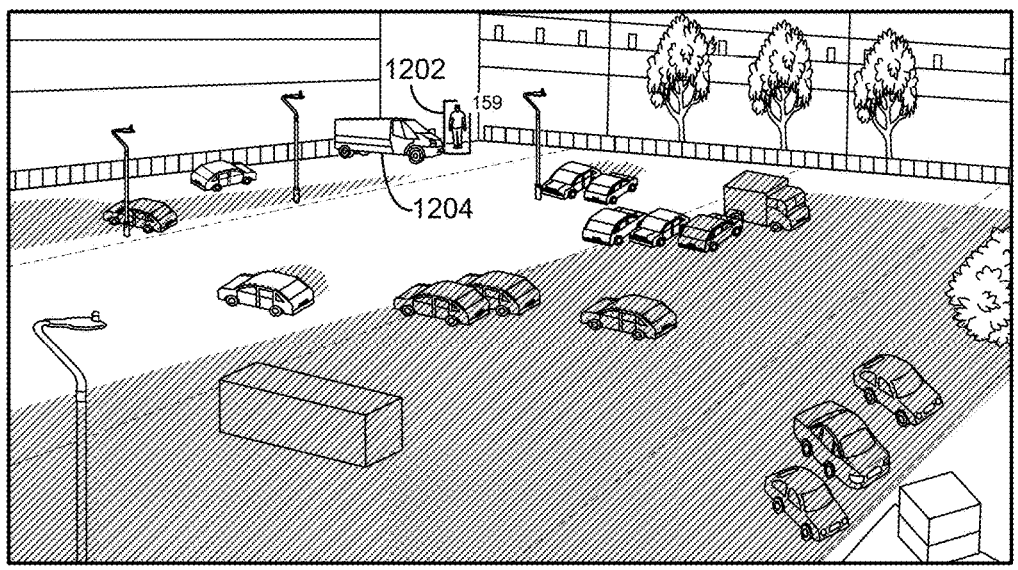
FIG. 12A is an illustration of a video frame of an environment in which an object is tracked, in accordance with some embodiments.
Figure 12B:
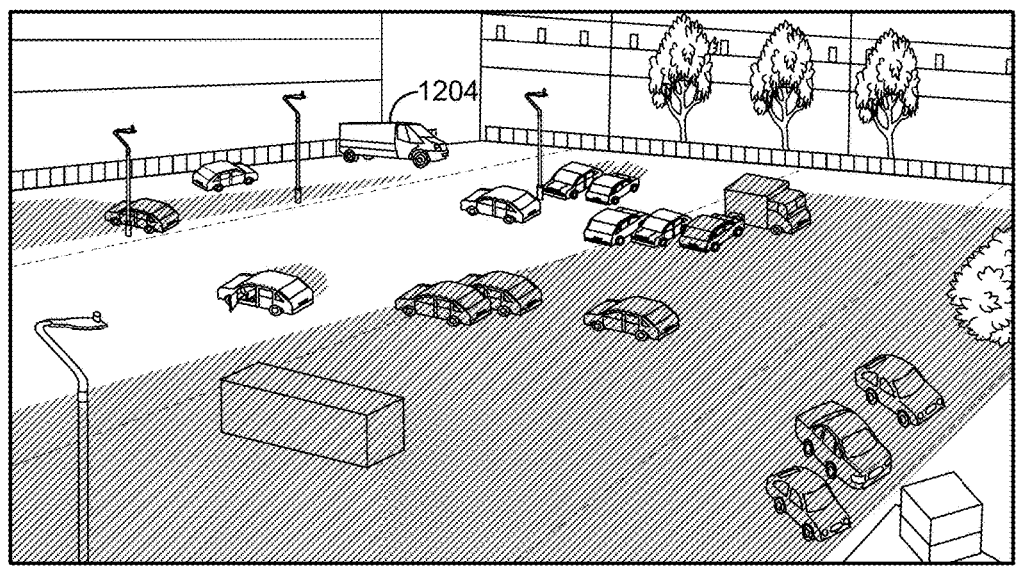
FIG. 12B is an illustration of a video frame of an environment in which the tracked object is lost, in accordance with some embodiments.
Figure 12C:
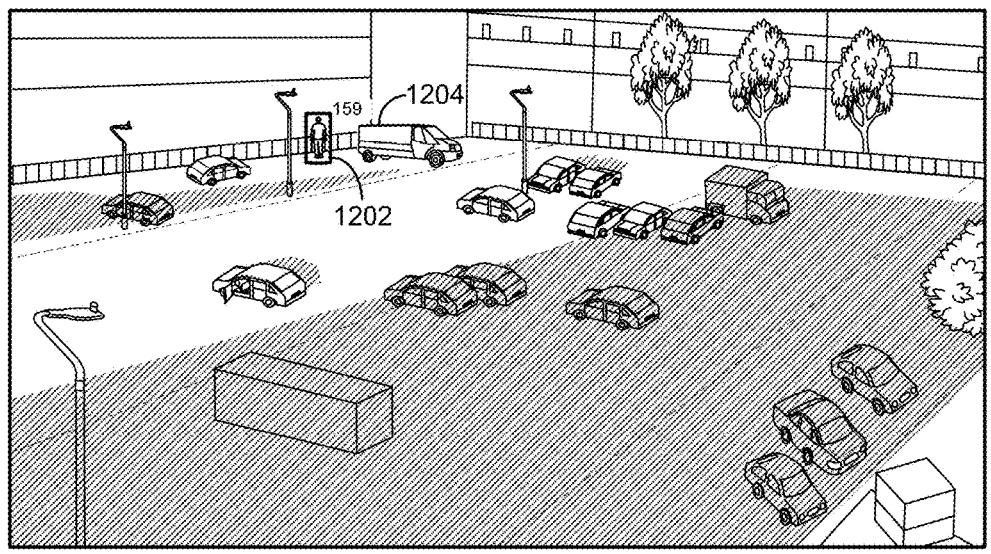
FIG. 12C is an illustration of a video frame of an environment in which an object is tracked after being lost, in accordance with some embodiments.
Figure 12D:
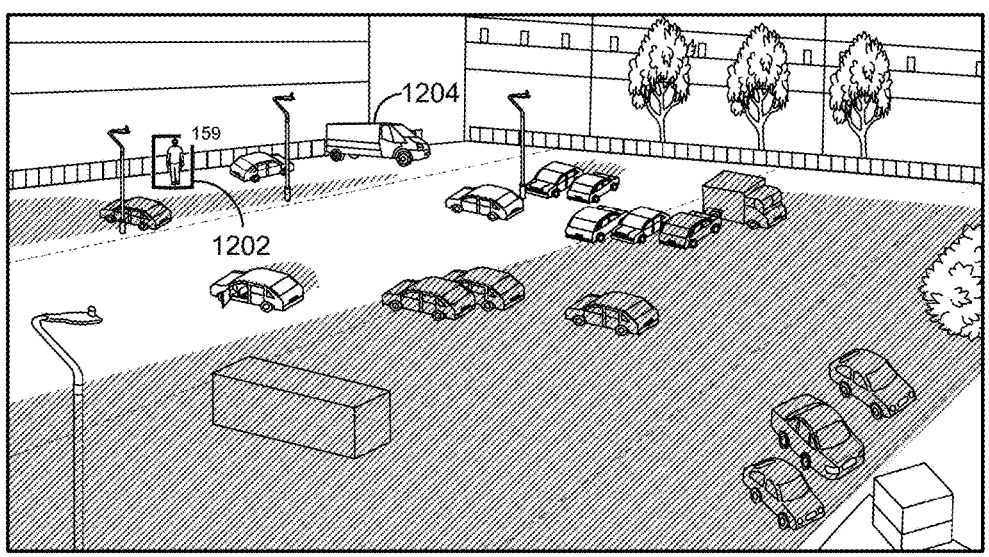
FIG. 12D is an illustration of a video frame of an environment in which the object is tracked after being lost, in accordance with some embodiments.

In example shown in FIG. 12A-FIG. 12C, although not shown above, it has been observed that the simple lost tracker duration threshold-based method has much less of a chance to turn the object to normal in the future, and in cases when an object is turned to be normal, a different tracker with a different ID is used to track the object. However, using the adaptive threshold-based techniques, the object has much more of a chance to be converted to normal (although from time to time it got lost again), and the ID is always consistent.

Using the above-described systems and methods, lost trackers can be maintained in an effective manner, preventing unnecessary objects and events from being generated by the video analytics system. Such systems and methods can lead to a significant increase in tracking accuracy by the video analytics system, among other advantages.

FIG. 13 illustrates an example of a process 1300 of maintaining lost blob trackers for one or more video frames using the adaptive duration techniques described herein. At block 1302, the process 1300 includes identifying one or more blob trackers maintained for a sequence of video frames. The one or more blob trackers are associated with one or more blobs of the sequence of video frames. The one or more blobs include pixels of at least a portion of one or more foreground objects in the sequence of video frames.

At block 1304, the process 1300 includes detecting a transition of a blob tracker from a first type of tracker to a lost tracker. The blob tracker is detected to be lost at a first video frame. The first video frame can be referred to as a transition-to-lost video frame of the blob tracker. As previously described, a transition-to-lost video frame of a blob tracker is the frame for which the blob tracker is detected to be lost (when the blob tracker is transitioned from the normal tracker to the lost tracker). The first type of tracker can also be referred to as a normal tracker. As described above, a normal tracker can be considered to be a lost tracker if the tracker does not match any blob detected for the current frame. For example, the blob tracker is transitioned from the first type of tracker (e.g., a normal tracker) to the lost tracker when a blob for which the blob tracker was associated with in a previous video frame is not detected in the first video frame (e.g., the blob tracker's transition-to-lost video frame). Trackers and associated blobs are output as identified blob tracker-blob pairs when the trackers are converted from new trackers to trackers of the first type. For example, a tracker-blob pair is output at the system level as an event (e.g., presented as a tracked object on a display, output as an alert, or other suitable event) when the tracker of the tracker-blob pair is promoted to be a normal tracker.

At block 1306, the process 1300 includes determining a recovery duration for the lost tracker at the first video frame. For example, when the state of the blob tracker is detected to be lost, the recovery duration can be determined. The recovery duration can also be referred to as the adaptive tracker recovery duration described above. For one or more subsequent video frames obtained after the first video frame, the lost tracker is removed from the one or more blob trackers maintained for the sequence of video frames when a lost duration for the lost tracker is greater than the recovery duration. The lost duration can include a duration since the transition of the blob tracker from a normal tracker to the lost tracker. For example, the lost duration can begin when the blob tracker is transitioned to the lost tracker. In some examples, the adaptive tracker recovery duration is unique to the blob tracker. For example, each tracker maintained for the sequence of video frames can be assigned a unique adaptive tracker recovery duration when the respective tracker is transitioned to a lost tracker.

In some examples, the adaptive tracker recovery duration of the lost tracker is adaptively set to a value based on a first duration of the blob tracker. The first duration can also be referred to as a normal duration, as described above. The first duration (or normal duration) includes a duration the blob tracker was first transitioned to be the first type of tracker (e.g., a normal tracker) until the first video frame (e.g., the tracker's transition-to-lost video frame). As noted previously, trackers and associated blobs are output as identified blob tracker-blob pairs when the trackers are converted from new trackers to the normal trackers of the first type. In some aspects, the recovery duration of the lost tracker is further modified as a minimum value between the first duration and a maximum recovery duration (also referred to as a maximum adaptive tracker recovery duration). In one illustrative example, the recovery duration can be defined as adaDuration=Min(nrmlDuration, LOST_TRACKER_LONGEST). The maximum recovery duration LOST_TRACKER_LONGEST can be set to any suitable value that sets the maximum amount of time a blob tracker can be a lost tracker before being killed or removed from the trackers maintained for the sequence of video frames.

In some examples, the first duration is determined based on a global duration of the blob tracker. The global duration includes a duration since the blob tracker is created (e.g., since the blob tracker became a new tracker). In some examples, the first duration is determined based on the global duration of the blob tracker and a second duration. The second duration can also be referred to as a new-to-normal duration, and includes a duration for converting blob trackers from new trackers to trackers of the first type (e.g., from new trackers to normal trackers). In one illustrative example, the normal duration for the blob tracker can be determined by subtracting the new-to-normal duration from the global duration (nrmlDuration=gDuration−newDuration).

In some examples, the process 1300 further includes determining a bounding box of the blob tracker is within an exclusion region of the first video frame. As noted above, an exclusion of a video frame can be defined by a boundary of the video frame or a defined exclusion zone. For example, the exclusion region can include a boundary of the first video frame. In another example, the exclusion region can include a defined exclusion zone of the first video frame. In such examples in which the bounding box of the blob tracker is determined to be within an exclusion region, the recovery duration is set as a predetermined value. The predetermined value causes the lost tracker to be removed from the plurality of blob trackers sooner than one or more lost blob trackers with bounding boxes not within the one or more exclusion regions the first video frame. In some cases, to ensure the lost tracker is removed quickly, the predetermined value can be set to a very small value (e.g., 3 frames, 4 frames, 5 frames, 6 frames, 10 frames, or other suitable value).

In some examples, the process 1300 further includes determining, for a subsequent video frame of the sequence of video frames, to remove the lost tracker from the plurality of blob trackers when the lost duration for the lost tracker is greater than the recovery duration. The subsequent video frame is obtained later in time than the first video frame.

In some examples, the process 1300 further includes obtaining a subsequent video frame of the sequence of video frames. The subsequent video frame is obtained later in time than the first video frame. In such examples, the process 1300 further includes determining the lost duration for the lost tracker. As explained above, the lost duration includes a duration since the transition of the blob tracker from the first type of tracker (e.g., a normal tracker) to the lost tracker. The process 1300 further includes determining the lost duration is greater than the recovery duration for the lost tracker, and removing the lost tracker from the plurality of blob trackers maintained for the sequence of video frames when the lost duration is greater than the recovery duration.

In some examples, the process 1300 further includes obtaining a subsequent video frame of the sequence of video frames. The subsequent video frame is obtained later in time than the first video frame. In such examples, the process 1300 further includes associating the lost tracker with a blob in the subsequent video frame, and converting the blob tracker from the lost tracker to the first type of tracker when the lost tracker is associated with the blob and when the lost duration for which the lost tracker is lost is less than the recovery duration. In some cases, the lost duration starts when the first video frame (e.g., the transition-to-lost video frame) for the lost tracker is detected, and the recovery duration applies from when the lost tracker is detected until the blob tracker is converted to the first type of tracker (e.g., to a normal tracker). For example, the lost duration starts when the blob tracker is transitioned from the first type of tracker to the lost tracker in the first video frame, and the recovery duration applies from when the blob tracker is transitioned from the first type of tracker to the lost tracker until the blob tracker is converted to the first type of tracker.

In some examples, the process 1300 may be performed by a computing device or an apparatus, such as the video analytics system 100. For example, the process 1300 can be performed by the video analytics system 100 and/or the object tracking engine 106 shown in FIG. 1. In some cases, the computing device or apparatus may include a processor, microprocessor, microcomputer, or other component of a device that is configured to carry out the steps of process 1300. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 1300 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The blob tracking operations discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of maintaining lost blob trackers for one or more video frames, the method comprising:
   identifying one or more blob trackers maintained for a sequence of video frames, wherein the one or more blob trackers are associated with one or more blobs of the sequence of video frames, the one or more blobs including pixels of at least a portion of one or more foreground objects in the sequence of video frames;
   detecting a transition of a blob tracker from a normal tracker to a lost tracker, wherein normal trackers and associated blobs are output as identified tracker-blob pairs, and wherein the blob tracker is transitioned from the normal tracker to the lost tracker when a blob the blob tracker was associated with in a previous frame is not detected in a current video frame; and
   determining a recovery duration for the lost tracker at the current video frame, the recovery duration being determined based on the blob tracker being transitioned to the lost tracker at the current video frame, wherein, for one or more subsequent video frames obtained after the current video frame, the lost tracker is removed from the one or more blob trackers maintained for the sequence of video frames when a lost duration for the lost tracker is greater than the recovery duration.

2. The method of claim 1, further comprising:
   obtaining a subsequent video frame of the sequence of video frames, wherein the subsequent video frame is obtained later in time than the current video frame;
   determining the lost duration for the lost tracker, the lost duration including a duration since the transition of the blob tracker from the normal tracker to the lost tracker;
   determining the lost duration is greater than the recovery duration for the lost tracker; and
   removing the lost tracker from the one or more blob trackers maintained for the sequence of video frames when the lost duration is greater than the recovery duration.

3. The method of claim 1, further comprising:
   obtaining a subsequent video frame of the sequence of video frames, wherein the subsequent video frame is obtained later in time than the current video frame;
   associating the lost tracker with a blob in the subsequent video frame; and
   converting the blob tracker from the lost tracker to the normal tracker when the lost tracker is associated with the blob and when the lost duration for which the lost tracker is lost is less than the recovery duration.

4. The method of claim 1, wherein the recovery duration of the lost tracker is adaptively set to a value based on a normal duration of the blob tracker, the normal duration including a duration the blob tracker was transitioned to be the normal tracker until the current video frame.

5. The method of claim 4, wherein the recovery duration of the lost tracker is further modified as a minimum value between the normal duration and a maximum recovery duration.

6. The method of claim 4, wherein the normal duration is determined based on a global duration of the blob tracker, the global duration including a duration since the blob tracker is created.

7. The method of claim 6, wherein the normal duration is determined based on the global duration of the blob tracker and a new duration, the new duration including a duration for converting blob trackers from new trackers to normal trackers.

8. The method of claim 1, further comprising:
   determining a bounding box of the blob tracker is within an exclusion region of the current video frame; and
   wherein the recovery duration is set as a predetermined value, the predetermined value causing the lost tracker to be removed from the one or more blob trackers sooner than one or more lost blob trackers with bounding boxes not within the exclusion region of the current video frame.

9. The method of claim 8, wherein the exclusion region includes a boundary of the current video frame.

10. The method of claim 1, wherein the lost duration starts when the blob tracker is transitioned from the normal tracker to the lost tracker in the current video frame, and wherein the recovery duration applies from when the blob tracker is transitioned from the normal tracker to the lost tracker until the blob tracker is converted to the normal tracker.

11. An apparatus comprising:
a memory configured to store video data; and
a processor configured to:
   identify one or more blob trackers maintained for a sequence of video frames, wherein the one or more blob trackers are associated with one or more blobs of the sequence of video frames, the one or more blobs including pixels of at least a portion of one or more foreground objects in the sequence of video frames;
   detect a transition of a blob tracker from a normal tracker to a lost tracker, wherein normal trackers and associated blobs are output as identified tracker-blob pairs, and wherein the blob tracker is transitioned from the normal tracker to the lost tracker when a blob the blob tracker was associated with in a previous frame is not detected in a current video frame; and
   determine a recovery duration for the lost tracker at the current video frame, the recovery duration being determined based on the blob tracker being transitioned to the lost tracker at the current video frame, wherein, for one or more subsequent video frames obtained after the current video frame, the lost tracker is removed from the one or more blob trackers maintained for the sequence of video frames when a lost duration for the lost tracker is greater than the recovery duration.

12. The apparatus of claim 11, wherein the processor is further configured to:
   obtain a subsequent video frame of the sequence of video frames, wherein the subsequent video frame is obtained later in time than the current video frame;
   determine the lost duration for the lost tracker, the lost duration including a duration since the transition of the blob tracker from the normal tracker to the lost tracker;
   determine the lost duration is greater than the recovery duration for the lost tracker; and
   remove the lost tracker from the one or more blob trackers maintained for the sequence of video frames when the lost duration is greater than the recovery duration.

13. The apparatus of claim 11, wherein the processor is further configured to:
   obtain a subsequent video frame of the sequence of video frames, wherein the subsequent video frame is obtained later in time than the current video frame;
   associate the lost tracker with a blob in the subsequent video frame; and
   convert the blob tracker from the lost tracker to the normal tracker when the lost tracker is associated with the blob and when the lost duration for which the lost tracker is lost is less than the recovery duration.

14. The apparatus of claim 11, wherein the recovery duration of the lost tracker is adaptively set to a value based on a normal duration of the blob tracker, the normal duration including a duration the blob tracker was transitioned to be the normal tracker until the current video frame.

15. The apparatus of claim 14, wherein the recovery duration of the lost tracker is further modified as a minimum value between the normal duration and a maximum recovery duration.

16. The apparatus of claim 14, wherein the normal duration is determined based on a global duration of the blob tracker, the global duration including a duration since the blob tracker is created.

17. The apparatus of claim 16, wherein the normal duration is determined based on the global duration of the blob tracker and a second new duration, the new duration including a duration for converting blob trackers from new trackers to normal trackers.

18. The apparatus of claim 11, wherein the processor is further configured to:
   determine a bounding box of the blob tracker is within an exclusion region of the current video frame; and
   wherein the recovery duration is set as a predetermined value, the predetermined value causing the lost tracker to be removed from the one or more blob trackers sooner than one or more lost blob trackers with bounding boxes not within the exclusion region of the current video frame.

19. The apparatus of claim 18, wherein the exclusion region includes a boundary of the current video frame.

20. The apparatus of claim 11, wherein the lost duration starts when the blob tracker is transitioned from the normal tracker to the lost tracker in the current video frame, and wherein the recovery duration applies from when the blob tracker is transitioned from the normal tracker to the lost tracker until the blob tracker is converted to the normal tracker.

21. A non-transitory computer readable medium having stored thereon instructions that, when executed by one or more processors, cause the one or more processor to:
   identify one or more blob trackers maintained for a sequence of video frames, wherein the one or more blob trackers are associated with one or more blobs of the sequence of video frames, the one or more blobs including pixels of at least a portion of one or more foreground objects in the sequence of video frames;
   detect a transition of a blob tracker from a normal tracker to a lost tracker, wherein normal trackers and associated blobs are output as identified tracker-blob pairs, and wherein the blob tracker is transitioned from the normal tracker to the lost tracker when a blob the blob tracker was associated with in a previous frame is not detected in a current video frame; and
   determine a recovery duration for the lost tracker at the current video frame, the recovery duration being determined based on the blob tracker being transitioned to the lost tracker at the current video frame, wherein, for one or more subsequent video frames obtained after the current video frame, the lost tracker is removed from the one or more blob trackers maintained for the sequence of video frames when a lost duration for the lost tracker is greater than the recovery duration.

22. The computer readable medium of claim 21, further comprising instructions that, when executed by one or more processors, cause the one or more processor to:
   obtain a subsequent video frame of the sequence of video frames, wherein the subsequent video frame is obtained later in time than the current video frame;
   determine the lost duration for the lost tracker, the lost duration including a duration since the transition of the blob tracker from the normal tracker to the lost tracker;
   determine the lost duration is greater than the recovery duration for the lost tracker; and
   remove the lost tracker from the one or more blob trackers maintained for the sequence of video frames when the lost duration is greater than the recovery duration.

23. The computer readable medium of claim 21, further comprising instructions that, when executed by one or more processors, cause the one or more processor to:
   obtain a subsequent video frame of the sequence of video frames, wherein the subsequent video frame is obtained later in time than the current video frame;

associate the lost tracker with a blob in the subsequent video frame; and convert the blob tracker from the lost tracker to the normal tracker when the lost tracker is associated with the blob and when the lost duration for which the lost tracker is lost is less than the recovery duration.

24. The computer readable medium of claim 21, wherein the recovery duration of the lost tracker is adaptively set to a value based on a normal duration of the blob tracker, the normal duration including a duration the blob tracker was transitioned to be the normal tracker until the current video frame.

25. The computer readable medium of claim 24, wherein the recovery duration of the lost tracker is further modified as a minimum value between the normal duration and a maximum recovery duration.

26. The computer readable medium of claim 24, wherein the normal duration is determined based on a global duration of the blob tracker and a new duration, the global duration including a duration since the blob tracker is created, and the new duration including a duration for converting blob trackers from new trackers to normal trackers.

27. The computer readable medium of claim 21, further comprising instructions that, when executed by one or more processors, cause the one or more processor to:

determine a bounding box of the blob tracker is within an exclusion region of the current video frame; and wherein the recovery duration is set as a predetermined value, the predetermined value causing the lost tracker to be removed from the one or more blob trackers sooner than one or more lost blob trackers with bounding boxes not within the exclusion region of the current video frame.

28. The computer readable medium of claim 27, wherein the exclusion region includes a boundary of the current video frame.

* * * * *